(12) United States Patent
Rico Alvarino et al.

(10) Patent No.: US 11,140,575 B2
(45) Date of Patent: Oct. 5, 2021

(54) MODIFYING CSI TRANSMISSIONS OVER UPLINK SHARED RESOURCES

(71) Applicant: QUALCOMM Incorporated, San Diego, CA (US)

(72) Inventors: Alberto Rico Alvarino, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 16/059,892

(22) Filed: Aug. 9, 2018

(65) Prior Publication Data

US 2019/0053097 A1    Feb. 14, 2019

Related U.S. Application Data

(60) Provisional application No. 62/544,198, filed on Aug. 11, 2017.

(51) Int. Cl.
*H04W 28/06* (2009.01)
*H04L 1/00* (2006.01)
(Continued)

(52) U.S. Cl.
CPC ............ *H04W 28/06* (2013.01); *H04B 7/063* (2013.01); *H04B 7/0626* (2013.01); *H04L 1/003* (2013.01);
(Continued)

(58) Field of Classification Search
CPC .............. H04W 28/06; H04W 72/0413; H04L 1/0029; H04L 1/003; H04L 5/0057;
(Continued)

(56) References Cited

U.S. PATENT DOCUMENTS

2011/0243066 A1* 10/2011 Nayeb Nazar ........ H04L 5/0016 370/328
2014/0098780 A1* 4/2014 Kim ...................... H04L 5/0055 370/329
(Continued)

FOREIGN PATENT DOCUMENTS

CA    2967281 A1    6/2016
EP    3358897 A1    8/2018
(Continued)

OTHER PUBLICATIONS

International Search Report and Written Opinion—PCT/US2018/046198—ISA/EPO—dated Nov. 26, 2018.
(Continued)

*Primary Examiner* — Will W Lin
(74) *Attorney, Agent, or Firm* — Holland & Hart LLP

(57) ABSTRACT

Methods, systems, and devices for wireless communication are described. A user equipment (UE) may identify a coding rate threshold associated with transmitting an uplink control information (UCI) message during a time period, determine whether to reduce a size of the UCI message based on the coding rate threshold, and transmit at least a portion of the UCI message on uplink shared resources allocated for the time period. The UE may determine to reduce the size of the UCI message by dropping portions of the UCI message based on a size of uplink control resources, a size of uplink shared resources, additional parameters signaled to the UE, or some combination of these factors.

32 Claims, 18 Drawing Sheets

(51) Int. Cl.
*H04L 5/00* (2006.01)
*H04B 7/06* (2006.01)
*H04W 72/04* (2009.01)
*H04B 7/0417* (2017.01)
*H04L 25/00* (2006.01)
*H04L 1/18* (2006.01)

(52) U.S. Cl.
CPC .......... *H04L 1/0004* (2013.01); *H04L 1/0009* (2013.01); *H04L 1/0021* (2013.01); *H04L 1/0026* (2013.01); *H04L 1/0029* (2013.01); *H04L 1/0073* (2013.01); *H04L 5/0057* (2013.01); *H04L 5/0064* (2013.01); *H04W 72/0413* (2013.01); *H04B 7/0417* (2013.01); *H04L 1/1896* (2013.01); *H04L 5/0055* (2013.01); *H04L 25/00* (2013.01)

(58) Field of Classification Search
CPC ... H04L 1/0026; H04L 5/0064; H04L 1/0073; H04L 1/0004; H04L 1/0009; H04L 1/0021; H04L 5/0055; H04L 25/00; H04L 1/1896; H04B 7/0626; H04B 7/063; H04B 7/0417
See application file for complete search history.

(56) References Cited

U.S. PATENT DOCUMENTS

| | | | |
|---|---|---|---|
| 2017/0048026 A1* | 2/2017 | Park | H04L 1/1864 |
| 2017/0318575 A1* | 11/2017 | Park | H04L 1/1896 |
| 2018/0006791 A1* | 1/2018 | Marinier | H04L 1/0057 |
| 2018/0192434 A1* | 7/2018 | Lee | H04W 28/26 |
| 2018/0255566 A1* | 9/2018 | Takeda | H04L 1/0073 |
| 2018/0278398 A1 | 9/2018 | Ahn et al. | |
| 2019/0007248 A1* | 1/2019 | Takeda | H04W 72/12 |
| 2019/0199477 A1* | 6/2019 | Park | H04L 1/0693 |
| 2019/0223204 A1* | 7/2019 | Kim | H04B 1/00 |
| 2020/0214024 A1* | 7/2020 | Lee | H04B 7/0639 |
| 2020/0252928 A1* | 8/2020 | Park | H04L 5/00 |

FOREIGN PATENT DOCUMENTS

| | | |
|---|---|---|
| WO | WO-2017052251 A1 | 3/2017 |
| WO | WO-2017078147 A1 | 5/2017 |

OTHER PUBLICATIONS

QUALCOMM Incorporated: "Discussion on MaximumCodeRate Applicability for Reporting over PUSCH", 3GPP Draft; R1-1712767 Discussion on MaximumCodeRate Applicability for Reporting over PUSCH, 3rd Generation Partnership Project (3GPP), Mobile Competence Centre, 650, Route Des Lucioles, F-06921 Sophia-Antipolis Cedex, France, vol. RAN WG1, No. Prague, Czechia; Aug. 21, 2017-Aug. 25, 2017 Aug. 20, 2017, XP051315580, Retrieved from the Internet: URL:http://www.3gpp.org/ftp/Meetings_3GPP_sync/ran1/Docs/ [retrieved on Aug. 20, 2017], 3 pages.

* cited by examiner

Dropped CSI report

MODIFYING CSI TRANSMISSIONS OVER UPLINK SHARED RESOURCES

CROSS REFERENCES

The present application for patent claims the benefit of U.S. Provisional Patent Application No. 62/544,198 by Rico Alvarino, et al., entitled "MODIFYING CSI TRANSMISSIONS OVER UPLINK SHARED RESOURCES," filed Aug. 11, 2017, assigned to the assignee hereof, and expressly incorporated herein.

BACKGROUND

The following relates generally to wireless communication and more specifically to modifying uplink control information transmissions over uplink shared resources.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, the UE may be configured to provide channel state information (CSI) in a CSI report over one or more control resources (e.g., physical uplink control channel (PUCCH) resources) indicated by the base station. The UE may be signaled a maximum coding rate for transmission of uplink control information (UCI) carrying the CSI report over the PUCCH resources. In some cases, the UCI payload may be large, thus requiring a higher coding rate for transmission, which in some cases may exceed the maximum specified coding rate. Moreover, the UE may also be configured to transmit the UCI over shared resources (e.g., physical uplink shared channel (PUSCH) resources). In some cases, however, transmission of UCI with a large payload over PUSCH resources may introduce complexities associated with determining one or more maximum coding rates for the UCI, determining the number of resource elements to use for UCI as opposed to data transmissions, as well as determining how to modify the UCI for transmission over the PUSCH resources.

SUMMARY

The described techniques related to improved methods, systems, devices, or apparatuses that support modifying uplink control information (UCI) such as channel state information (CSI) reports for transmission over uplink shared resources. A wireless device such as a user equipment (UE) may identify a maximum coding rate associated with transmitting a UCI message, and in some cases, may be configured to modify a size of a UCI message to satisfy the maximum coding rate for transmission over uplink shared resources (e.g., physical uplink shared channel (PUSCH) resources). Modifying the size of a UCI message for transmission over uplink shared resources may include dropping certain portions of the message based on one or more dropping rules. The dropping rules may be based on one or more parameters that are signaled to the UE. For instance, the dropping rules may be based on a size of uplink control resources (e.g., physical uplink control channel (PUCCH) resources), a size of uplink shared resources (e.g., PUSCH resources), or some combination of these factors. The dropping rules may account for the complexities of encoding and transmitting UCI messages over shared resources, such as the different coding rates associated with transmitting the different portions of the UCI message.

In some cases, the UE may determine whether to modify the size of a UCI message for transmission over uplink shared resources by assuming it will transmit the UCI message over uplink control resources and utilizing the dropping rules based on this assumption. In such cases, the dropping rules may be based on rules used for transmitting UCI messages over PUCCH resources. Additionally or alternatively, the dropping rules may be based on a separately signaled maximum coding rate, a separate reference resource used for calculating the UCI dropping rules, or some combination of these parameters. In some examples, the UE may calculate the UCI dropping rules based on the actual resource allocation of uplink shared resources (e.g., a size of PUSCH resources). In yet other examples, the UE may determine not to modify the size of a UCI message based on an assumption that the network has allocated sufficient uplink shared resources to accommodate the UCI message.

A method of wireless communication is described. The method may include identifying a coding rate threshold associated with transmitting a UCI message during a time period, determining whether to reduce a size of the UCI message based at least in part on the coding rate threshold, and transmitting at least a portion of the UCI message on uplink shared resources allocated for the time period.

An apparatus for wireless communication is described. The apparatus may include means for identifying a coding rate threshold associated with transmitting a UCI message during a time period, means for determining whether to reduce a size of the UCI message based at least in part on the coding rate threshold, and means for transmitting at least a portion of the UCI message on uplink shared resources allocated for the time period.

Another apparatus for wireless communication is described. The apparatus may include a processor, memory in electronic communication with the processor, and instructions stored in the memory. The instructions may be operable to cause the processor to identify a coding rate threshold associated with transmitting a UCI message during a time period, determine whether to reduce a size of the UCI message based at least in part on the coding rate threshold, and transmit at least a portion of the UCI message on uplink shared resources allocated for the time period.

A non-transitory computer readable medium for wireless communication is described. The non-transitory computer-readable medium may include instructions operable to cause a processor to identify a coding rate threshold associated with transmitting a UCI message during a time period, determine whether to reduce a size of the UCI message based at least in part on the coding rate threshold, and transmit at least a portion of the UCI message on uplink shared resources allocated for the time period.

Some examples of the method, apparatus, and non-transitory computer-readable medium described above may further include processes, features, means, or instructions for reducing the size of the UCI message based at least in part on the coding rate threshold and a size of uplink control resources associated with the time period.

Some examples of the method, apparatus, and non-transitory computer-readable medium described above may further include processes, features, means, or instructions for receiving an indication message that indicates which of a plurality of resource blocks of the uplink control resources to use for determining a reduced size of the UCI message. Some examples of the method, apparatus, and non-transitory computer-readable medium described above may further include processes, features, means, or instructions for reducing the size of the UCI message based at least in part on a size of the indicated resource block.

In some examples of the method, apparatus, and non-transitory computer-readable medium described above, the indication message comprises an acknowledgment resource indicator (ARI) message.

Some examples of the method, apparatus, and non-transitory computer-readable medium described above may further include processes, features, means, or instructions for transmitting a modified coding rate threshold for use in the uplink shared resources. Some examples of the method, apparatus, and non-transitory computer-readable medium described above may further include processes, features, means, or instructions for reducing the size of the UCI message based at least in part on the modified coding rate.

In some examples of the method, apparatus, and non-transitory computer-readable medium described above, the modified coding rate may be based at least in part on one of a transport block size or a ratio of control symbols to shared channel symbols.

Some examples of the method, apparatus, and non-transitory computer-readable medium described above may further include processes, features, means, or instructions for receiving a reference resource associated with the uplink shared resources that may be configured for calculating a reduced size of the UCI message. Some examples of the method, apparatus, and non-transitory computer-readable medium described above may further include processes, features, means, or instructions for reducing the size of the UCI message based at least in part on the reference resource.

In some examples of the method, apparatus, and non-transitory computer-readable medium described above, the uplink control resources comprise PUCCH resources.

Some examples of the method, apparatus, and non-transitory computer-readable medium described above may further include processes, features, means, or instructions for reducing the size of the UCI message based at least in part on the coding rate threshold and a size of the uplink shared resources.

Some examples of the method, apparatus, and non-transitory computer-readable medium described above may further include processes, features, means, or instructions for calculating a number of bits for transmitting at least a subset of the UCI message. Some examples of the method, apparatus, and non-transitory computer-readable medium described above may further include processes, features, means, or instructions for calculating a coding rate for transmitting the subset of the UCI message based at least in part on the calculated number of bits and the size of the uplink shared resources. Some examples of the method, apparatus, and non-transitory computer-readable medium described above may further include processes, features, means, or instructions for reducing the size of the UCI message based at least in part on the calculated coding rate.

Some examples of the method, apparatus, and non-transitory computer-readable medium described above may further include processes, features, means, or instructions for identifying a plurality of subsets of the UCI message. Some examples of the method, apparatus, and non-transitory computer-readable medium described above may further include processes, features, means, or instructions for calculating a coding rate for transmitting each of the plurality of subsets. Some examples of the method, apparatus, and non-transitory computer-readable medium described above may further include processes, features, means, or instructions for reducing the size of the UCI message by dropping bits associated with any of the plurality of subsets based at least in part on the calculated coding rates.

In some examples of the method, apparatus, and non-transitory computer-readable medium described above, the plurality of subsets comprise bits for jointly conveying a channel quality indicator (CQI) and a precoding matrix indicator (PMI), bits for conveying a rank indicator (RI), bits for conveying a channel state information reference signal indicator (CRI), or a combination thereof.

Some examples of the method, apparatus, and non-transitory computer-readable medium described above may further include processes, features, means, or instructions for identifying a plurality of subsets of the UCI message. Some examples of the method, apparatus, and non-transitory computer-readable medium described above may further include processes, features, means, or instructions for identifying at least one prioritized subset from the plurality subsets of the UCI message. Some examples of the method, apparatus, and non-transitory computer-readable medium described above may further include processes, features, means, or instructions for calculating a coding rate for transmitting each of the plurality of subsets. Some examples of the method, apparatus, and non-transitory computer-readable medium described above may further include processes, features, means, or instructions for reducing the size of the UCI message by dropping bits associated with any of the plurality of subsets other than the at least one prioritized subset based at least in part on the calculated coding rates.

In some examples of the method, apparatus, and non-transitory computer-readable medium described above, the at least one prioritized subset comprises bits for conveying a RI, bits for conveying CRI, or a combination thereof.

Some examples of the method, apparatus, and non-transitory computer-readable medium described above may further include processes, features, means, or instructions for identifying a plurality of subsets of the UCI message. Some examples of the method, apparatus, and non-transitory computer-readable medium described above may further include processes, features, means, or instructions for identifying a first group and a second group of the plurality of subsets of the UCI message. Some examples of the method, apparatus, and non-transitory computer-readable medium described above may further include processes, features, means, or instructions for calculating a coding rate for transmitting each of the first group and the second group.

Some examples of the method, apparatus, and non-transitory computer-readable medium described above may further include processes, features, means, or instructions for reducing the size of the UCI message by dropping bits associated with the first group based at least in part on the calculated coding rate for the first group. Some examples of the method, apparatus, and non-transitory computer-readable medium described above may further include processes, features, means, or instructions for reducing the size of the UCI message by dropping bits associated with the second group based at least in part on the calculated coding rate for the second group.

In some examples of the method, apparatus, and non-transitory computer-readable medium described above, the first group comprises bits for conveying a RI, bits for conveying CRI, or a combination thereof.

In some examples of the method, apparatus, and non-transitory computer-readable medium described above, the second group comprises bits for jointly conveying a PMI, bits for conveying a CQI, or a combination thereof.

Some examples of the method, apparatus, and non-transitory computer-readable medium described above may further include processes, features, means, or instructions for transmitting the UCI message on the uplink shared resources without reducing the size of the UCI message.

Some examples of the method, apparatus, and non-transitory computer-readable medium described above may further include processes, features, means, or instructions for receiving an indication of the coding rate threshold.

In some examples of the method, apparatus, and non-transitory computer-readable medium described above, the time period comprises a subframe.

In some examples of the method, apparatus, and non-transitory computer-readable medium described above, the uplink shared resources comprise PUSCH resources.

A method of wireless communication is described. The method may include identifying an upcoming transmission of UCI message during a time period, allocating uplink shared resources for the time period based at least in part on a size of the UCI message, and receiving at least a portion of the UCI message on the allocated uplink shared resources.

An apparatus for wireless communication is described. The apparatus may include means for identifying an upcoming transmission of a UCI message during a time period, means for allocating uplink shared resources for the time period based at least in part on a size of the UCI message, and means for receiving at least a portion of the UCI message on the allocated uplink shared resources.

Another apparatus for wireless communication is described. The apparatus may include a processor, memory in electronic communication with the processor, and instructions stored in the memory. The instructions may be operable to cause the processor to identify an upcoming transmission of a UCI message during a time period, allocate uplink shared resources for the time period based at least in part on a size of the UCI message, and receive at least a portion of the UCI message on the allocated uplink shared resources.

A non-transitory computer readable medium for wireless communication is described. The non-transitory computer-readable medium may include instructions operable to cause a processor to identify an upcoming transmission of an UCI message during a time period, allocate uplink shared resources for the time period based at least in part on a size of the UCI message, and receive at least a portion of the UCI message on the allocated uplink shared resources.

Some examples of the method, apparatus, and non-transitory computer-readable medium described above may further include processes, features, means, or instructions for determining the size of the UCI message based at least in part on a size of an upcoming data transmission during the time period.

In some examples of the method, apparatus, and non-transitory computer-readable medium described above, the uplink shared resources comprise PUSCH resources.

In some examples of the method, apparatus, and non-transitory computer-readable medium described above, the time period comprises a subframe.

DETAILED DESCRIPTION

Figure 1:
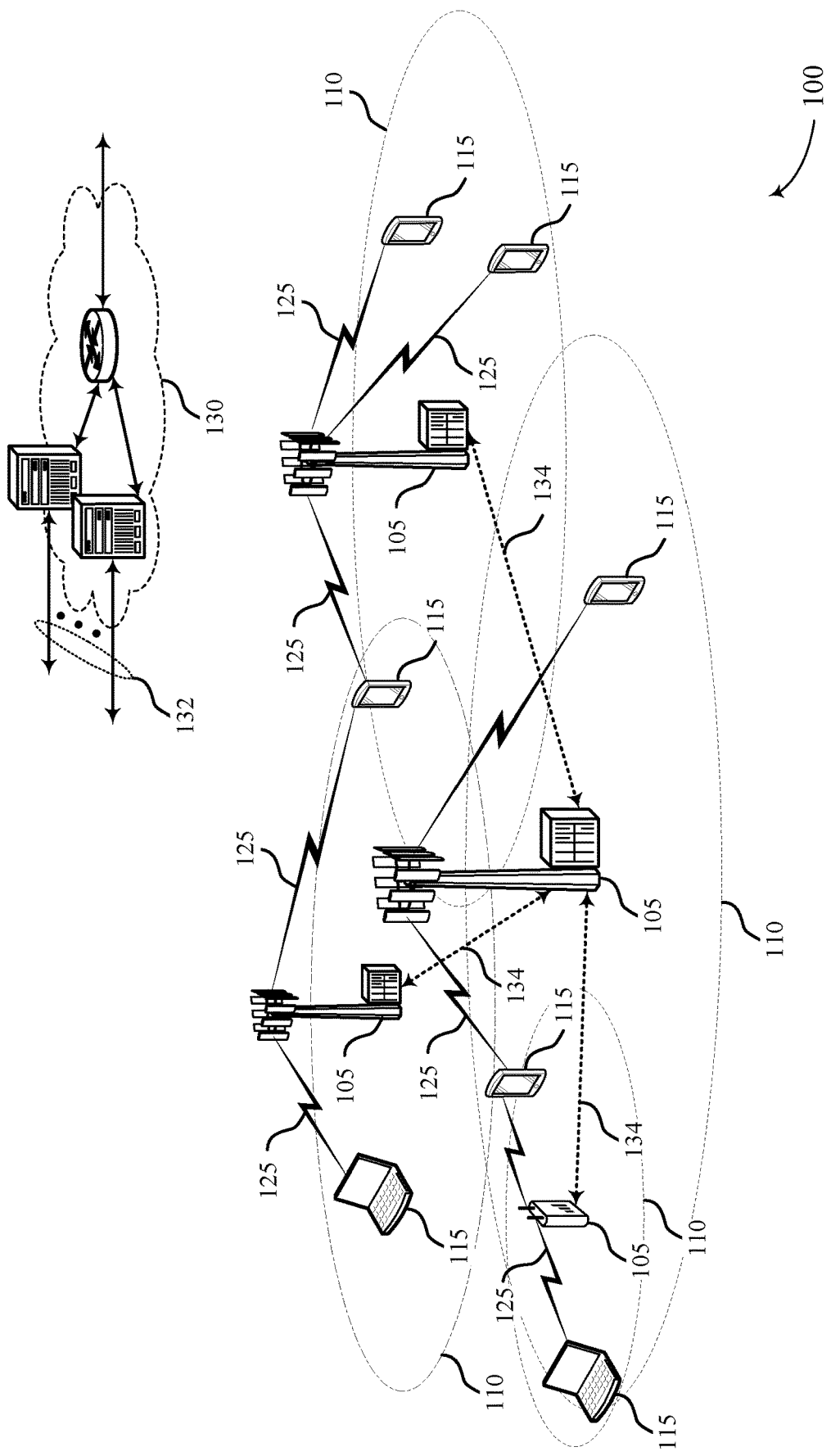
FIGS. 1 and 2 illustrate examples of systems for wireless communications that support modifying channel state information (CSI) transmissions over uplink shared resources in accordance with aspects of the present disclosure.

In wireless communications systems, a user equipment (UE) may convey uplink control information (UCI) messages such as channel state information (CSI) reports to indicate the channel properties of a communication link, or to recommend one or more parameters for transmission (e.g., a precoding matrix or a rank indication) to the network. A UCI message may include hybrid automatic repeat request (HARD) acknowledgment information (e.g., ACK/NACK bits), a channel quality indicator (CQI), a precoding matrix indicator (PMI), a precoding type indicator (PTI), a rank indicator (RI), CSI reference signal (CSI-RS) resource indication (CRI), or some combination thereof.

In some cases, a UE may be configured to transmit a UCI message over uplink shared resources (e.g., physical uplink shared channel (PUSCH) resources) during a particular time period or subframe. However, transmitting UCI over PUSCH resources may introduce additional complexity as compared to transmitting UCI over PUCCH resources. For example, when transmitting UCI over PUCCH, all of the UCI bits may be jointly encoded (e.g., the RI, CQI, PMI, and ACK/NACK bits along with the cyclic redundancy check (CRC) bits), which may facilitate calculation of a single coding rate for the entire UCI message. The single coding rate for the UCI message may be compared with a coding rate threshold, and the UE may drop portions of the UCI message until the coding rate threshold is satisfied.

In contrast, when transmitting UCI over PUSCH, different portions of the UCI message may be encoded separately and may be encoded using different coding techniques. For example, the ACK/NACK bits may be encoded using repetition coding, and the RI bits may be separately encoded using repetition coding, while the CQI and PMI may be jointly encoded using tail-biting convolutional coding (TBCC). In some aspects, each portion of the UCI message may be associated with a different coding rate (e.g., due to the different size or coding technique used to encode the portion). Therefore, some portions of the UCI message may satisfy the coding rate threshold (e.g., be lower than the threshold) while other portions may not. Due to the various coding rates and combinations of information which may be encoded in each portion of the UCI message, determining which portions of the UCI message to drop to satisfy the overall coding rate threshold may be more complicated than when transmitting the UCI message over PUCCH.

In accordance with aspects of the present disclosure, techniques for determining how to modify a UCI message for transmission over PUSCH resources are described which may account for the additional complexities of transmitting UCI messages over PUSCH resources. In some examples, the UE may perform UCI dropping calculations as if it were transmitting the UCI over PUCCH although the UCI is transmitted over PUSCH. In such examples, the UE may modify the dropping calculations based on additional parameters such as a separately signaled maximum rate (e.g., a separate rate for each portion of the UCI message) or a separate reference resource used for performing the dropping calculations.

In yet other examples, the UE may perform UCI dropping calculations based on the actual number of resources allocated for PUSCH. In such examples, the UE may drop bits from each portion of the UCI message (e.g., from each of CQI/PMI, RI, and CRI) until the coding rate threshold is satisfied. Additionally or alternatively, the UE may drop bits from only certain portions of the UCI message (e.g., drops bits from CQI/PMI but not from RI or CRI portions) until the coding rate threshold is satisfied. In some other examples, the UE may drop bits from one group of UCI portions until the coding rate threshold for that group is satisfied and then drop bits from another group of UCI portions until the coding rate threshold for that second group is satisfied. For example, the UE may drop reports from the group of UCI portions containing RI and CRI until the coding rate threshold is satisfied, and then drop reports from the group of UCI portions containing CQI and PMI (if needed) until the coding rate threshold is satisfied for that group.

In some examples, the UE may perform UCI transmissions over PUSCH resources under the assumption that the network has allocated sufficient PUSCH resources to carry the UCI while maintaining the required coding rate. In such cases, the UE may not drop any part of the UCI message.

Aspects of the disclosure are initially described in the context of a wireless communications system. Examples of uplink transmission messages are illustrated to describe techniques for dropping CSI reports in a UCI message carried on PUSCH resources. Aspects of the disclosure are further illustrated by and described with reference to apparatus diagrams, system diagrams, and flowcharts that relate to modifying CSI transmissions over uplink shared resources.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. The wireless communications system 100 may support transmissions of UCI messages over PUSCH resources, and may support modifying the size of UCI messages (e.g., by dropping portions of the UCI messages) to satisfy a coding rate threshold associated with transmitting the UCI messages over PUSCH resources.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods.

In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communications system 100 may support aspects of modifying CSI transmissions over uplink shared resources between a UE 115, a base station 105, core network 130 (e.g., a core network node), or some combination, for example, by dropping one or more CSI reports of a UCI message prior to transmission on a PUSCH resource.

In some cases, the UE 115 may transmit a UCI message to the base station 105 to provide information on channel properties of a communication link 125, such as the effects of scattering and fading, or to recommend a precoding matrix or rank indication to the network. A UCI message may include at least a CQI, a PMI, a PTI, a RI, ACK/NACK, CRI, or a combination. The UE 115 may determine the resources to be used to transmit the UCI message based at least in part on a previously-received downlink transmission, such as downlink control information (DCI) carried on a physical downlink control channel (PDCCH). In some cases, the UE 115 may drop one or more portions of the UCI message (e.g., one or more CSI reports) to satisfy one or more coding rate thresholds. The UE 115, the base station 105, and/or other devices may implement one or more techniques described in accordance with various aspects of the present disclosure to modify CSI transmissions over uplink shared resources to satisfy a coding rate threshold.

Figure 2:
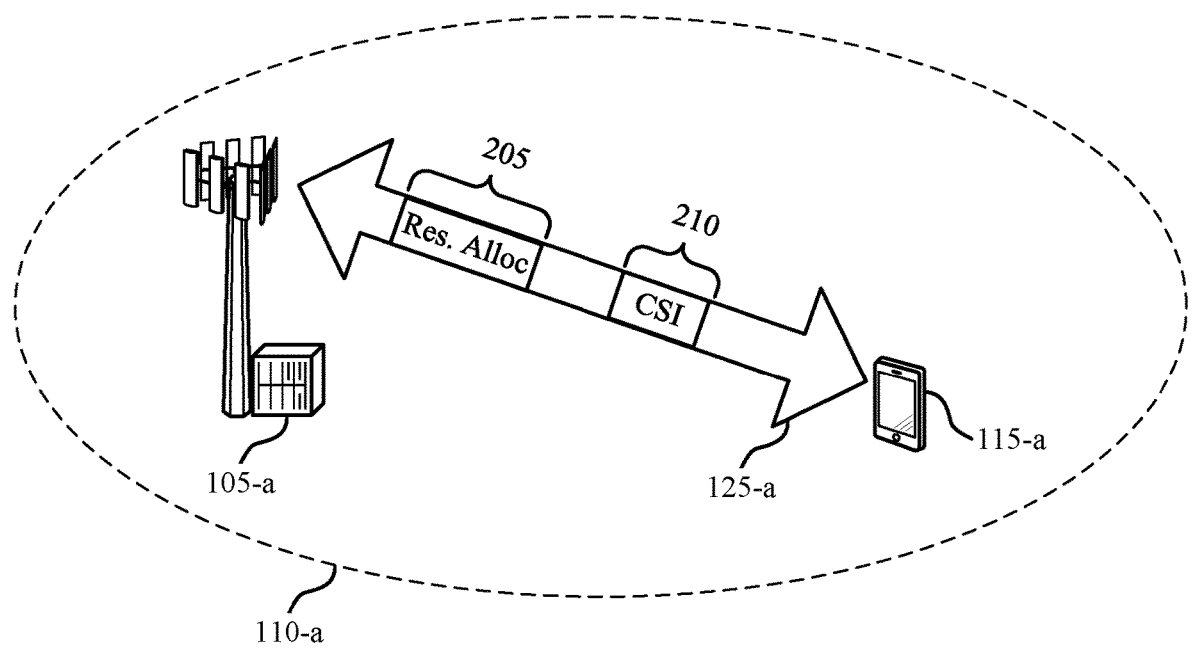

FIG. 2 illustrates an example of a wireless communications system 200 that supports modifying CSI transmissions over uplink shared resources in accordance with various aspects of the present disclosure. In some examples, wireless communications system 200 may implement aspects of wireless communications system 100. The wireless communications system 200 may include UE 115-a and a base station 105-a, which may be examples of the UE 115 and base station 105 as described with reference to FIG. 1. As shown, UE 115-a may communicate with base station 105-a via communication link 125-a. The wireless communications system 200 may illustrate aspects of different schemes for CSI dropping over PUSCH between UE 115-a and base station 105-*a*. In some cases, wireless communications system 200 may operate in millimeter wave (mmW) spectrum.

In wireless communications system 200, UE 115-*a* may provide a UCI message, such as CSI 210 to the base station 105-*a*. The CSI 210 may include one or more portions conveying CQI, PMI, PTI, RI, CRI, ACK/NACK, or some combination of this information. As described above, when conveying CSI 210 over PUSCH resources, the different portions of the CSI 210 may be separately encoded using one or more different coding techniques. The base station 105-*a* may convey a coding rate threshold (e.g., a maximum coding rate) to the UE 115-*a*, which may represent a maximum coding rate associated with transmitting the CSI 210. As described in accordance with various aspects of the present disclosure, the UE 115-*a* may modify a sizes of the CSI 210 (e.g., by dropping one or more portions of the message) to satisfy this coding rate threshold.

In some examples, the UE 115-*a* may perform dropping calculations under the assumption that it is going to transmit the CSI 210 over PUCCH resources, although the UE 115-*a* may ultimately transmit the CSI 210 over PUSCH resources. In such examples, the UE 115-*a* may drop one or more portions of UCI messages in order to accommodate the size of PUCCH resources, where the dropping is based in part on dropping rules configured for selecting PUCCH resources. In some examples, one or more PUCCH resources (e.g., a subset of uplink resources 205) may be scheduled during a particular subframe, and the UE 115-*a* may determine dropping calculations for transmitting UCI based on those PUCCH resources, even though the UE 115-*a* will transmit the UCI over PUSCH resources.

In some cases, the UE 115-*a* may be explicitly signaled which PUCCH resource to use for transmitting control information in a particular subframe, for example, via an ARI message. In such cases, the UE 115-*a* may drop one or more portions of the CSI 210 (if needed) to satisfy the coding rate threshold based on the size of the signaled PUCCH resource, and then transmit the CSI 210 over one or more PUSCH resources.

In other examples, the UE 115-*a* may not be explicitly signaled which PUCCH resource to use for transmitting control information. In such cases, if the UE 115-*a* is configured with only one PUCCH resource, the UE 115-*a* may drop one or more portions of the CSI 210 (if needed) to satisfy the coding rate threshold based on the size of the one PUCCH resource, and then transmit the CSI 210 over one or more PUSCH resources.

In other cases, if the UE 115-*a* is configured with multiple PUCCH resources, the UE 115-*a* may determine if the entirety of the CSI 210 can be transmitted on a first PUCCH resource (e.g., based on the size of the first PUCCH resource and the coding rate threshold), and if so, the UE 115-*a* may transmit the CSI 210 without any size modification on one or more PUSCH resources. In some other cases, the UE 115-*a* may be unable to transmit the entire CSI 210 over the first PUCCH resource without satisfying the coding rate threshold. In such cases, the UE 115-*a* may determine whether the entire CSI 210 could be transmitted over a second PUCCH resource (e.g., based on the size of the second PUCCH resource and the coding rate threshold), and if so, the UE 115-*a* may transmit the CSI 210 without any size modification on one or more PUSCH resources. If the UE 115-*a* cannot transmit the entire CSI 210 over the first or second PUCCH resource (or any number of additional scheduled PUCCH resources) without satisfying the coding rate threshold, then the UE 115-*a* may drop one or more portions of the CSI 210 until the coding rate is satisfied (based on a size of the first or second PUCCH resource), and then transmit the reduced-size CSI 210 over one or more PUSCH resources.

In accordance with aspects of the present disclosure, the following is a more detailed explanation of techniques for dropping portions of CSI 210 based on a size of PUCCH resources when no PUCCH resource is explicitly indicated. In one example, there may be no PUCCH resources (e.g., format 4/5) indicated by an ARI message. Further, there may be more than one periodic CSI (P-CSI) report in a particular subframe. In such cases, if the UE 115-*a* is configured with only one PUCCH resource for multi-P-CSI, the UE 115-*a* may use the configured PUCCH resource for HARQ-ACK and P-CSI transmission. That is, the UE 115-*a* may perform the dropping calculations as if it were going to use the configured PUCCH resource, and then transmit the CSI 210 over PUSCH resources. For instance, if the UE 115-*a* is configured with PUCCH format 4 or PUCCH format 5, and transmits the UCI over PUSCH resources, the UE 115-*a* may select one or more CSI reports for transmission following the same procedures as for transmission over PUCCH resources. In some cases, the UE 115-*a* may transmit UCI over PUCCH resources, for example, if the UE 115-*a* is not allocated resources (e.g., via a PUSCH grant).

In some other cases, the UE 115-*a* may be configured with two or more PUCCH resources (e.g., format 4) for multi-P-CSI. In such cases, the dropping rules used by the UE 115-*a* may be based in part on the number of REs available for data from the PUCCH resources with the smaller number of PRBs, and the maximum coding rate. For example, the UE 115-*a* may denote: $X=N_{RE} \times 2 \times r$, where $N_{RE}$ is the number of REs available and 'r' is the configured maximum code rate for the PUCCH format. In some cases, if the total number of HARQ-ACK and CSI feedback bits before any potential dropping is less than or equal to X, the PUCCH resource with the smaller number of PRBs may be used for performing the dropping calculations for transmitting the CSI 210 over PUSCH resources. In some cases, the UE 115-*a* may determine that the UCI payload exceeds X. In such cases, the UE 115-*a* may use the PUCCH resource with the larger number of PRBs for performing the dropping calculations for transmitting the CSI 210 over PUSCH resources.

In some cases, the procedure for HARQ-ACK and P-CSI transmission using the configured multi-P-CSI PUCCH resource (e.g., format 4/5) may be similar to, or mirror the procedure for when the PUCCH resource is indicated by ARI, as further described below.

For example, one or more PUCCH resources (e.g., format 4/5) may be indicated by an ARI message, and furthermore, there may be more than one P-CSI report in the subframe. Similar to as described above, in some cases, the UE 115-*a* may denote: $X_1=N_{RE} \times 2 \times r$ for a PUCCH format 4 resource; and $X_2=N_{RE} \times r$ for PUCCH format 5 resource, where N is the number of REs available for data from the PUCCH resource (e.g., format 4 or 5) and 'r' is the configured maximum code rate for the PUCCH resource. In some cases, the total number of HARQ-ACK bits and/or the P-CSI bits before any potential dropping may be less than $X_1$ or $X_2$, depending on the format of the PUCCH resource. In such cases, the UE 115-*a* may transmit the HARQ-ACK and the P-CSI (e.g., portions of CSI 210) on one or PUSCH resources without dropping any portions of the CSI 210. That is, based on the size of the PUCCH resources being sufficiently large to convey the HARQ-ACK and the P-CSI, the UE 115-*a* may transmit the entire CSI 210 on PUSCH resources without dropping any portion of the UCI.

In other cases, the UE 115-*a* may determine that the number of HARQ-ACK and/or P-CSI bits exceed $X_1$ or $X_2$. In such cases, the UE 115-*a* may select the CSI reports to be transmitted on the PUSCH resources, based on, for example, a prioritization of the one or more CSI reports. For instance, the CSI reports may be selected in a descending order of priority, until the total number of spatially bundled HARQ-ACK bits and P-CSI bits corresponds to X. In such cases, the UE 115-*a* may transmit the selected HARQ-ACK and P-CSI on PUSCH resources based on the size of the reduced CSI 210 satisfying the coding rate threshold.

As described above, the UE 115-*a* may utilize the same or a variation of the UCI dropping rules set for PUCCH to determine how to modify a size of CSI 210 for transmission over PUSCH resources. In some other cases, the UE 115-*a* may assume that the network or base station 105-*a* has allocated sufficient PUSCH resources to meet both the coding rate, as well as the UCI payload. In some examples, the UE 115-*a* or base station 105-*a* may separately signal a maximum coding rate to use for dropping in PUSCH, a separate reference resource for UCI transmission on PUSCH (e.g. a number of 'virtual' PUCCH resource blocks to use as a reference for UCI transmission on PUSCH), or a combination thereof. Furthermore, in some examples, the UE 115-*a* may calculate the UCI resources to drop, based on the actual resource allocation of PUSCH. Such techniques may allow the UE 115-*a* to drop UCI resources over a PUSCH transmission to ensure compliance with the maximum coding rate specified by the network.

Figure 3:
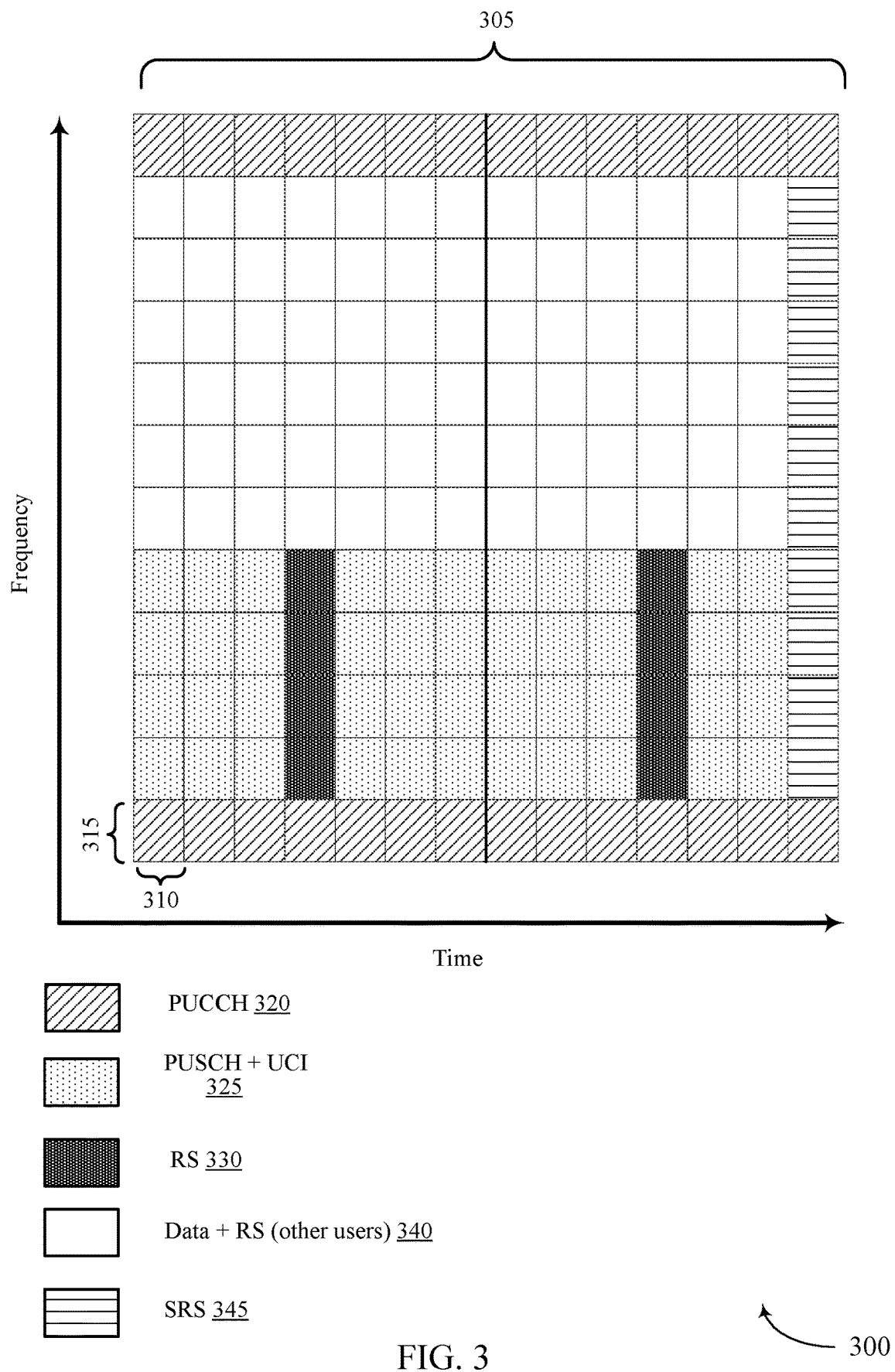
FIG. 3 illustrates an example of a wireless communications message that supports modifying CSI transmissions over uplink shared resources in accordance with aspects of the present disclosure.

FIG. 3 illustrates an example of a wireless communications message 300 that supports modifying CSI transmissions over uplink shared resources in accordance with various aspects of the present disclosure. The wireless communications message 300 may contain an uplink subframe 305 that is sent from a UE 115 to a base station 105. The uplink subframe 305 may be an example of a time period described herein. The uplink subframe 305 may include time resources such as one or more time increments 310 (e.g., OFDM symbols), and frequency resources such as one or more frequency increments 315 (e.g., subcarriers). However, it should be understood that other increments of time and frequency may be used, depending on the type of subframe or type of wireless system employed. The wireless communications message 300 may illustrate an example of some of the relevant channels and resources in accordance with dropping CSI reports for a CSI transmission over PUSCH, as described with reference to FIG. 2.

The uplink subframe 305 may include a PUCCH region 320, a PUSCH region 325 over which a UE 115 may transmit data as well as a part of the UCI, and reference signals (RS) 330. Furthermore, the uplink subframe 305 may include a data region 340 allocated to one or more other UEs 115. In some cases, the data region 340 may further include one or more reference signals (not shown). Each region may occupy one or more time and frequency resources. It should be noted that in some cases the UE 115 may not support simultaneous PUCCH and PUSCH transmissions. Thus, in some cases, the PUCCH region 320 and PUSCH region 325 may not coexist in the same subframe.

In some cases, UE 115 may have a PUSCH transmission in the uplink subframe 305, and the UE 115 may not support simultaneous PUCCH and PUSCH transmissions. In such cases, the UE 115 may transmit the UCI (or at least a portion of the UCI) over PUSCH region 325. In some cases, the UE 115-*a* may need to drop a part of the UCI, even for transmissions over PUSCH. However, as previously described, transmission of UCI over PUSCH may lead to further complexities associated with selecting a maximum coding rate, determining the number of resource elements, as well as determining the dropping rules.

In some examples, the UE 115 may perform UCI dropping for PUSCH region 325 based at least in part on the dropping rules set for PUCCH resources. For example, the UE 115 may calculate the number of bits for dropping based on the assumption that the UCI will be transmitted over PUCCH, as described above with reference to FIG. 2. The UE 115 may then proceed to transmit the UCI with the one or more CSI reports over PUSCH.

In some examples, the UE 115 may perform UCI transmissions under the assumption that the network has allocated sufficient PUSCH resources in PUSCH region 325 to carry the UCI while satisfying the coding rate threshold. In such cases, the UE 115 may not drop any part of the UCI.

In some examples, the UE 115 may receive an indication or some parameters for the dropping rules to utilize for UCI transmissions over PUSCH from the network. In such cases, the network or base station 105 may signal a maximum coding rate to use for dropping a part of the UCI while transmitting over PUSCH. The base station 105 may signal separate coding rates for the separate portions of the UCI, as described above. In other cases, the UE 115 may signal a maximum coding rate it will use for dropping a part of the UCI. Furthermore, in some cases, the UE 115 may receive an indication of a separate reference resource for UCI transmission on PUSCH. For instance, the UE may be configured with multiple PUCCH resources (e.g., a first resource with 2 PRBs and a second resource with 4 PRBs). In such cases, the UE 115 may assume the number of PRBs for PUSCH to be a combination of the resources allocated for PUCCH (e.g., 6 PRBs), and utilize it as a reference while performing UCI dropping. It should be noted that the reference number of PUSCH resources based on which a part of the UCI is dropped, may be used as an estimate or assumption, which may or may not correspond with the actual number of resources allocated for UCI transmissions over PUSCH.

In some examples, and as described in more detail below, the UE 115 may perform UCI dropping, based on the actual resource allocation for PUSCH.

Figure 4:
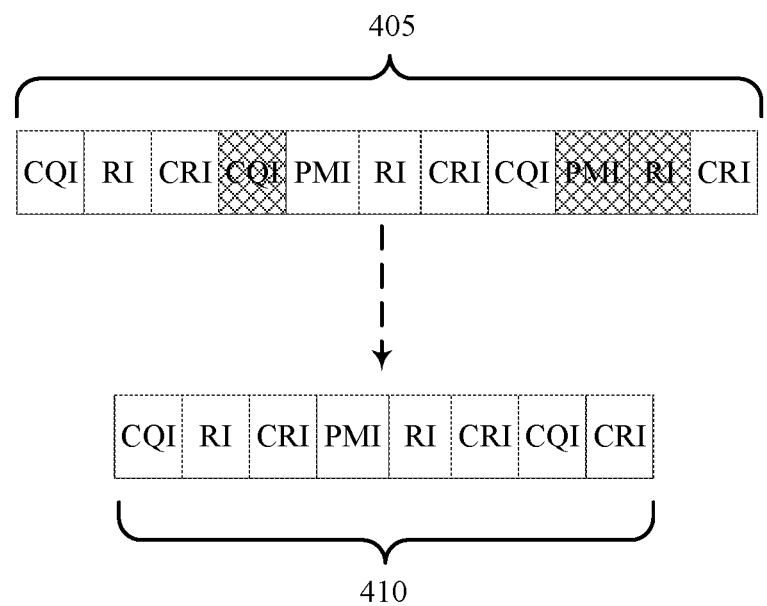
FIG. 4 illustrates an example of a process that supports modifying CSI transmissions over uplink shared resources in accordance with aspects of the present disclosure.
Figure 4:
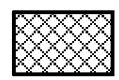

FIG. 4 illustrates an example of a process 400 that supports modifying CSI transmissions over uplink shared resources in accordance with various aspects of the present disclosure. The process 400 may relate to dropping a part of a UCI message 405, such as one or more CSI reports, in order to satisfy a coding rate threshold, as further described with reference to FIGS. 1-3. Process 400 may be performed between a UE 115 and a base station 105, which may be examples of the UE 115 and base station 105 described with reference to FIG. 1.

UCI message 405 may comprise one or more portions (e.g., CSI reports), such as one or more of CQI, RI, PMI, CRI, ACK/NACK etc. Furthermore, the UE may be allocated PUSCH resource 410 for transmission of the one or more CSI reports. In some cases, as illustrated in FIG. 4, the UE 115 may need to drop one or more CSI reports from the UCI message 405 prior to transmission over PUSCH, to satisfy a maximum coding rate based on a size of the PUSCH resource 410. It should be noted that the dropping of the one or more CSI reports, as illustrated in FIG. 4, are examples, and should not be construed as the only implementation of dropping CSI reports while transmitting UCI over PUSCH.

In some cases, the UE 115 may perform UCI dropping, based on the actual number of resources allocated for PUSCH. For instance, the number of modulation coded symbols for a CQI transmitted in a CSI report per layer Q', may be given by:

$$Q' = \min\left(\left\lceil \frac{(O+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, \right. \qquad (1)$$

$$\left. M_{sc}^{PUSCH} \cdot N_{symb}^{PUSCH} - \frac{Q_{RI}^{(x)}}{Q_m^{(x)}} \right),$$

where O is the number of CQI/PMI bits, $N_{symb}^{PUSCH-initial(x)}$ is the number of SC-FDMA symbols per subframe for initial PUSCH transmissions for the same transport block, $M_{sc}^{PUSCH-initial(x)}$ is a scheduled bandwidth for PUSCH transmission in a current sub-frame for a transport block, and expressed as a number of subcarriers, L is the number of CRC bits given by:

$$L = \begin{cases} 0, & O \le 11 \\ 8, & \text{otherwise} \end{cases},$$

and
$Q_{CQI} = Q_m^{(x)}$. Q' and $\beta_{offset}^{PUSCH} = \beta_{offset}^{CQI}$, where $\beta_{offset}^{CQI}$ may be based in part on the number of transmission codewords for the corresponding PUSCH, and on the uplink power control subframe set for the corresponding PUSCH when two uplink power control subframe sets are configured by higher layers for the cell. Furthermore, $Q_m^{(x)}$ may be the modulation for a given transport block, and K is a size in number of bits of a transport block. Lastly, if a RI is not transmitted then $Q_{RI}^{(x)} = 0$.

Further, the number of modulation coded symbols for CSI reporting bits such as ACK, RI, and/or CRI per layer Q' may be given by:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right), \qquad (2)$$

In some cases, the UE 115 may determine the number of bits to drop in a UCI transmission over a PUSCH based at least part on equations (1) and (2) described above. In such cases, the final number of bits to transmit may be denoted by 'O'.

In some cases, the UE 115 may decide to drop CSI reports from the UCI message 405 until the one or more obtained values of $Q_{CQI/PMI}$, $Q_{RI}$, and/or $Q_{CRI}$ satisfies the maximum coding rate. For instance, in the case of a single layer (e.g., single antenna port), the coding rate may satisfy: $2rQ_{CQI/PMI} > (O_{P-CSI} + O_{CRC})$, and/or $2Q_{RI} > (O_{RI})$ (e.g., for QPSK).

In some other cases, in order to meet the coding rate constraints, the UE 115 may not drop CSI bits from the UCI message 405 for certain CSI indicators or portions (e.g., RI or CRI), but may instead take into account other CSI bits, such as CQI or PMI. In some cases, the portions of UCI message 405 that are not subject to dropping may be considered of higher priority than those portions that are dropped. Thus, in such cases, the UE 115 may only drop CSI reports until the following is satisfied: $2rQ_{CQI/PMI} > (O_{P-CSI} + O_{CRC})$. In some circumstances, this may be irrespective or independent of the value of $Q_{RI}$.

In some other cases, the maximum coding rate to satisfy may be based in part on one or more other parameters such as a $\beta_{PUSCH}$ offset, or a transport block (TB) size.

In some cases, the UE 115 may determine that CSI feedback and UCI dropping is limited by a particular subset of indicator(s). For example, the UE 115 may determine that CSI feedback and UCI dropping is limited by the RI/CRI feedback, due to higher priority for RI/CRI reports. In such cases, the UE 115 may determine that the number of reports for a particular indicator (e.g., RI/CRI) is disproportionate to the number of reports with CQI/PMI, or any other indicator. In some cases, the UE 115 may then decide to prioritize each type of CSI feedback (e.g., RI/CRI feedback, or CQI/PMI feedback) individually. For instance, the UE 115 may associate each type of CSI feedback (e.g., RI, CRI, CQI, PMI) with a group. In some cases, there may be more than one CSI feedback types associated with a group.

Further, the UE 115 may calculate or receive a coding rate for transmitting each of the groups. In some examples, the UE 115 may determine that one or more reports associated with one or more of the groups do not meet the coding rate constraints. For example, the UE 115 may determine that one or more reports containing RI/CRI from a first group do not meet the coding rate constraints. In some cases, the UE 115 may then proceed to drop reports containing RI/CRI from the first group, by prioritization, until the coding rate constraint is satisfied. In some examples, the UE 115 may then evaluate if one or more reports containing CQI/PMI from a second group do not satisfy the coding rate constraint. If so, the UE 115 may continue dropping reports from the second group containing CQI/PMI until the coding rate is met. In some cases, the coding rate constraint for CQI/PMI and the code constraint for RI/CRI may be different, and may be indicated separately.

Figure 5:
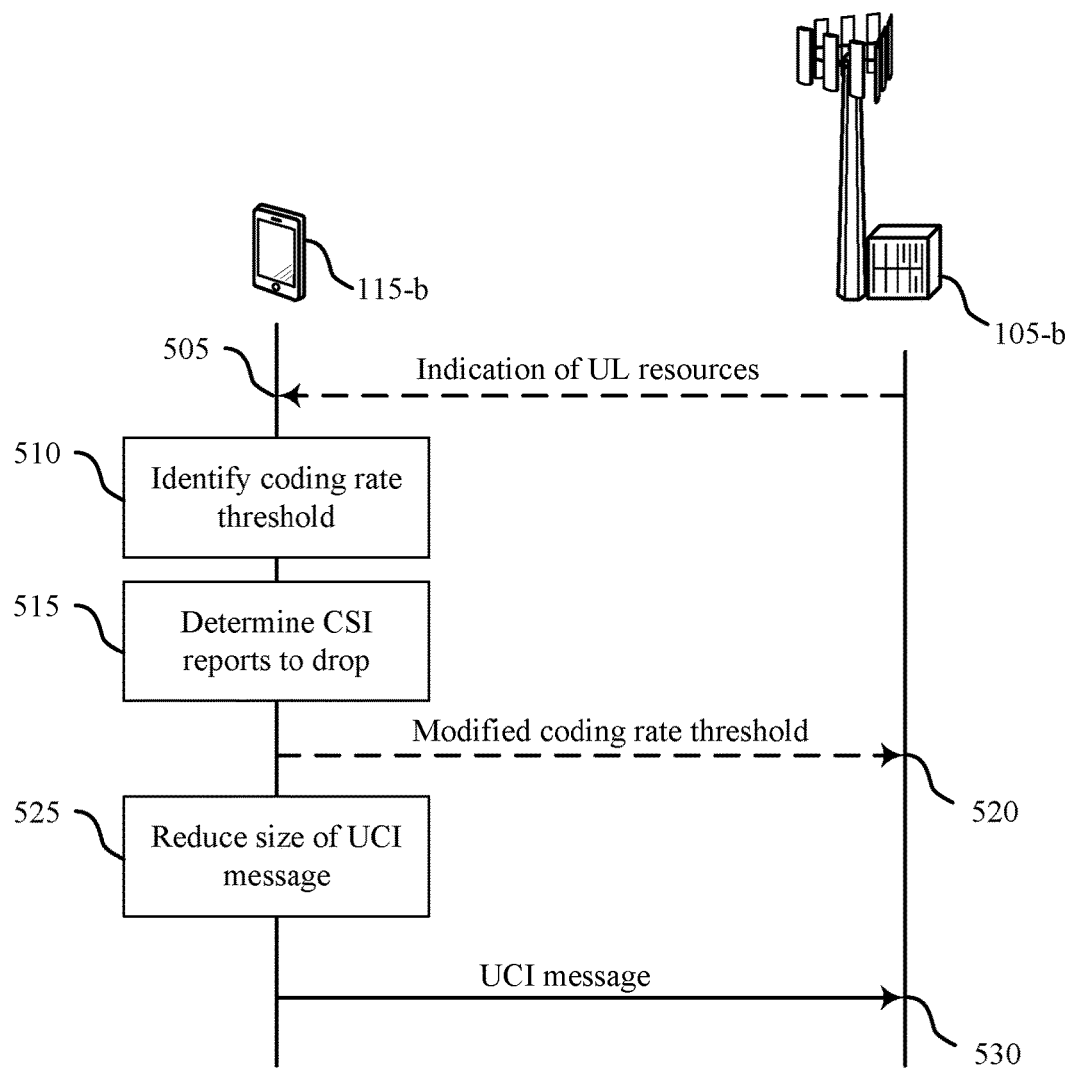
FIG. 5 illustrates an example of a process flow that supports modifying CSI transmissions over uplink shared resources in accordance with aspects of the present disclosure.

FIG. 5 illustrates an example of a process flow 500 that supports modifying CSI transmissions over uplink shared resources in accordance with various aspects of the present disclosure. The process flow illustrated by process flow 500 may be implemented by a UE 115-b and a base station 105-b, which may be examples of a UE 115 and base station 105 described with reference to FIGS. 1 and 2. In some examples, the process illustrated by flow diagram 500 may be implemented in a wireless system employing mmW communications.

At 505, in some cases, the UE 115-b may receive an indication of UL resources to use for transmitting one or more CSI reports in a UCI message over a PUSCH, from the base station 105-b. In some other cases, the indication message received from the base station 105-b may indicate a plurality of resource blocks of uplink control resources to use for determining a reduced size of the UCI message.

At 510, the UE 115-b may identify a coding rate threshold to satisfy for transmission of the UCI message. In some cases, the UE 115-b may explicitly receive an indication of the coding rate threshold from the base station 105-b. In some other cases, the base station 105-b may signal a modified coding rate threshold, which may be specific to UCI transmissions over PUSCH.

At 515, the UE 115-b may identify one or more CSI reports to drop, based at least in part on the UL resources indicated at 505, the coding rate or modified coding rate threshold from 510, or a combination thereof. Further, in some cases, the one or more CSI reports to drop may be determined based in part on the procedures described in FIGS. 1-4. For instance, the UE 115-*b* may perform UCI dropping for PUSCH based in part on the dropping rules set for PUCCH resources. In some other cases, the UE 115-*b* may determine CSI reports to drop from the UCI message based on a separate reference resource for UCI transmission on PUSCH, and the modified coding rate threshold received in 510. In some cases, the UE 115-*b* may determine CSI reports to drop from the UCI message based on the actual resource allocation for PUSCH.

At 520, in some cases, the UE 115-*b* may transmit a modified coding rate threshold to the base station 105-*b*, based on which UCI dropping may be performed.

At 525, the UE 115-*b* may reduce the size of the UCI message based in part on the CSI reports identified to be dropped at 515, the modified coding rate threshold transmitted at 520, or a combination thereof.

At 530, the UE 115-*b* may transmit the truncated or reduced UCI message to the base station 105-*b*.

Figure 6:
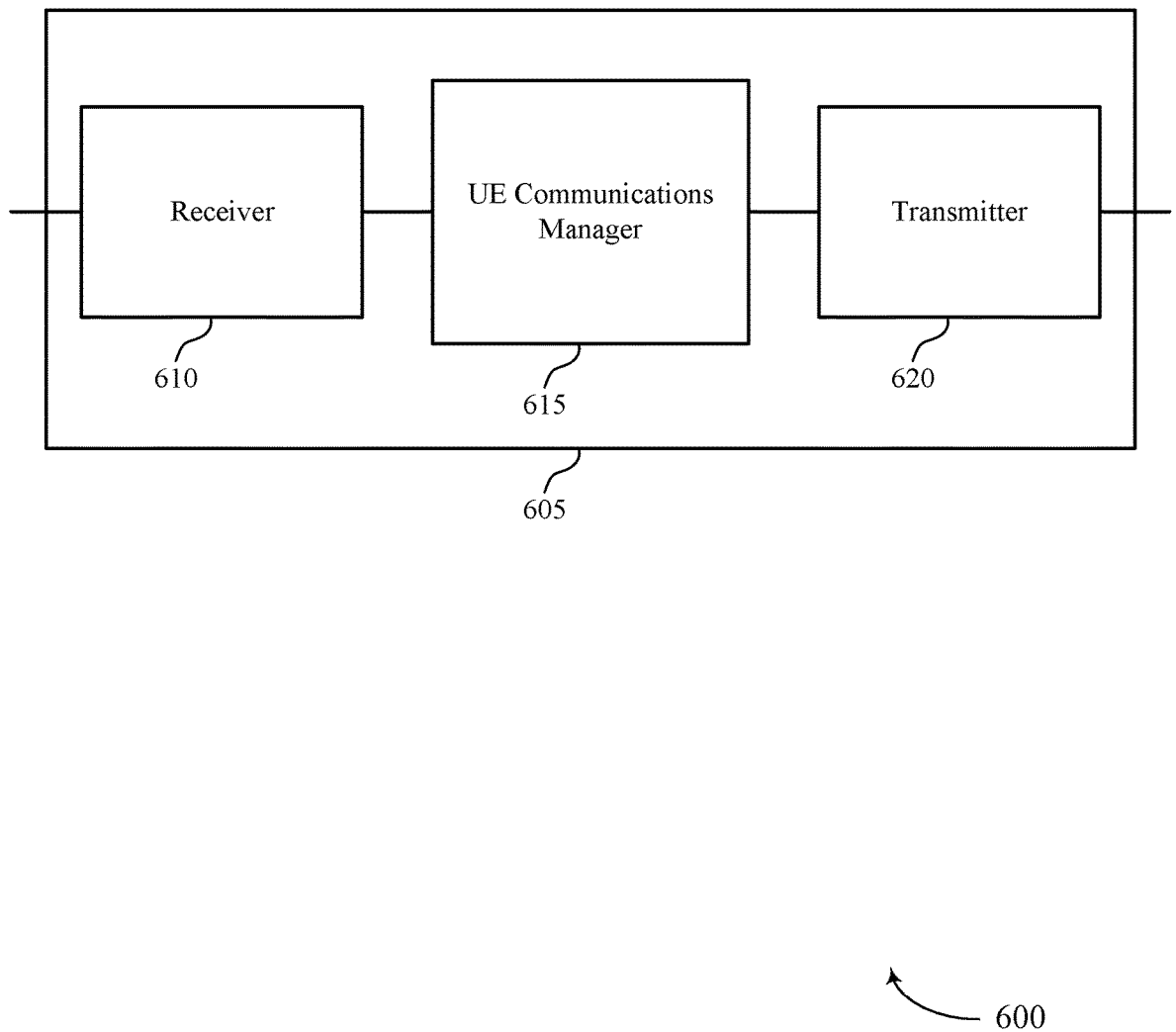
FIGS. 6 through 8 show block diagrams of a device that supports modifying CSI transmissions over uplink shared resources in accordance with aspects of the present disclosure.

FIG. 6 shows a block diagram 600 of a wireless device 605 that supports modifying CSI transmissions over uplink shared resources in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to modifying CSI transmissions over uplink shared resources, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify a coding rate threshold associated with transmitting a UCI message during a time period, determine whether to reduce a size of the UCI message based on the coding rate threshold, and transmit at least a portion of the UCI message on uplink shared resources allocated for the time period.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
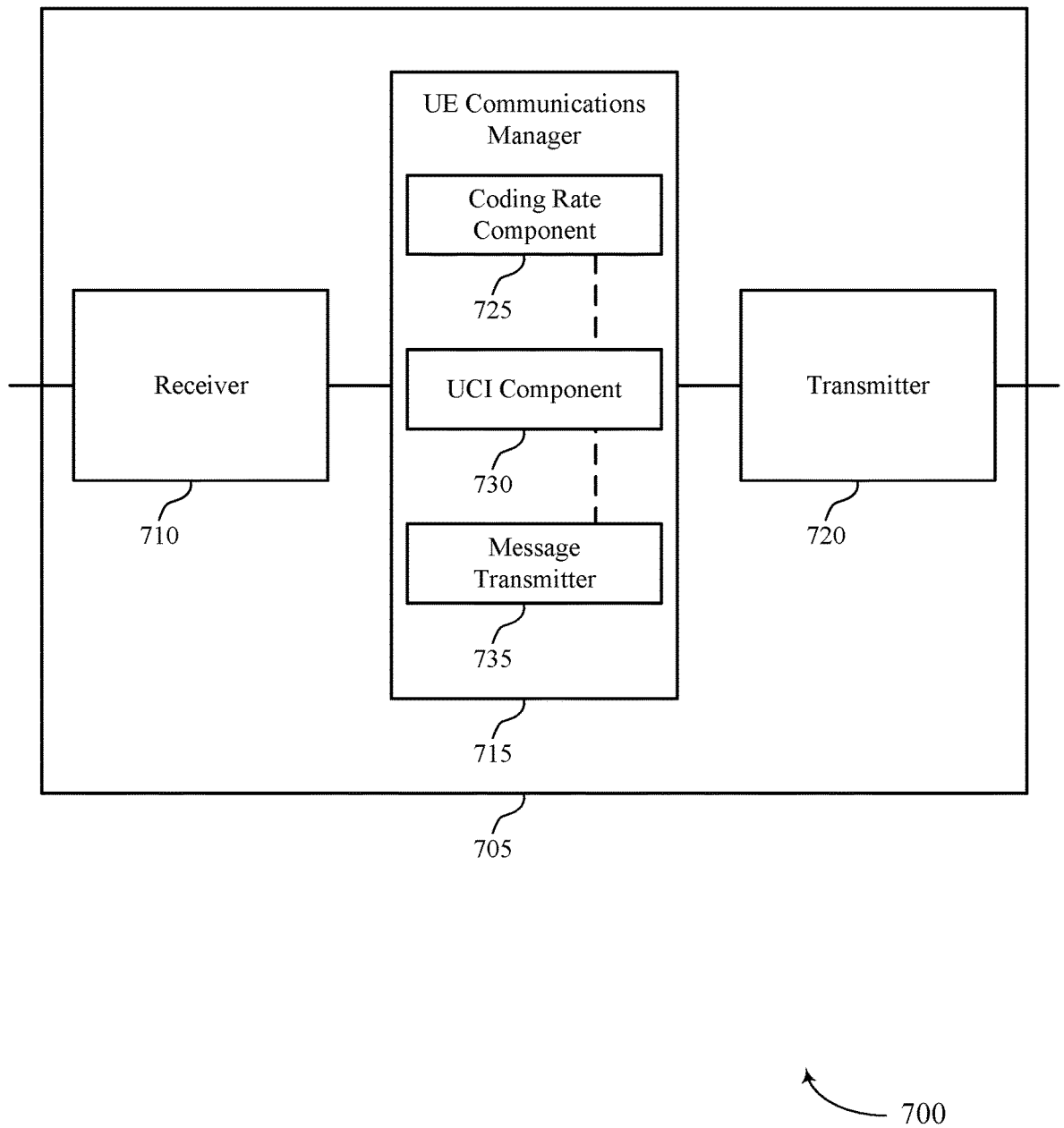

FIG. 7 shows a block diagram 700 of a wireless device 705 that supports modifying CSI transmissions over uplink shared resources in accordance with aspects of the present disclosure. Wireless device 705 may be an example of aspects of a wireless device 605, or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to modifying CSI transmissions over uplink shared resources, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include coding rate component 725, UCI component 730, and message transmitter 735.

Coding rate component 725 may identify a coding rate threshold associated with transmitting a UCI message during a time period, transmit a modified coding rate threshold for use in the uplink shared resources, calculate a coding rate for transmitting the subset of the UCI message based on the calculated number of bits and the size of the uplink shared resources, calculate a coding rate for transmitting each of the set of subsets, and calculate a coding rate for transmitting each of the first group and the second group. In some cases, the modified coding rate is based on one of a transport block size or a ratio of control symbols to shared channel symbols.

UCI component 730 may determine whether to reduce a size of the UCI message based on the coding rate threshold, reduce the size of the UCI message based on a size of the indicated resource block, reduce the size of the UCI message based on the modified coding rate, reduce the size of the UCI message based on the reference resource, reduce the size of the UCI message based on the coding rate threshold and a size of the uplink shared resources, and calculate a number of bits for transmitting at least a subset of the UCI message.

Further, the UCI component 730 may reduce the size of the UCI message based on the calculated coding rate, identify a set of subsets of the UCI message, reduce the size of the UCI message by dropping bits associated with any of the set of subsets based on the calculated coding rates, reduce the size of the UCI message based on the coding rate threshold and a size of uplink control resources associated with the time period, and identify at least one prioritized subset from the set subsets of the UCI message.

In some other cases, the UCI component 730 may reduce the size of the UCI message by dropping bits associated with any of the set of subsets other than the at least one prioritized subset based on the calculated coding rates, identify a first group and a second group of the set of subsets of the UCI message, reduce the size of the UCI message by dropping bits associated with the first group based on the calculated coding rate for the first group, and reduce the size of the UCI message by dropping bits associated with the second group based on the calculated coding rate for the second group. In some cases, the second group includes bits for jointly conveying a PMI, bits for conveying a CQI, or a combination thereof. In some cases, the at least one prioritized subset includes bits for conveying a RI, bits for conveying a CRI, or a combination thereof. In some cases, the first group includes bits for conveying a RI, bits for conveying a CRI, or a combination thereof. In some cases, the set of subsets include bits for jointly conveying a CQI and a PMI, bits for conveying a RI, bits for conveying a CRI, or a combination thereof.

Message transmitter 735 may transmit at least a portion of the UCI message on uplink shared resources allocated for the time period and transmit the UCI message on the uplink shared resources without reducing the size of the UCI message. In some cases, the uplink control resources include PUCCH resources. In some cases, the time period includes a subframe. In some cases, the uplink shared resources include PUSCH resources.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
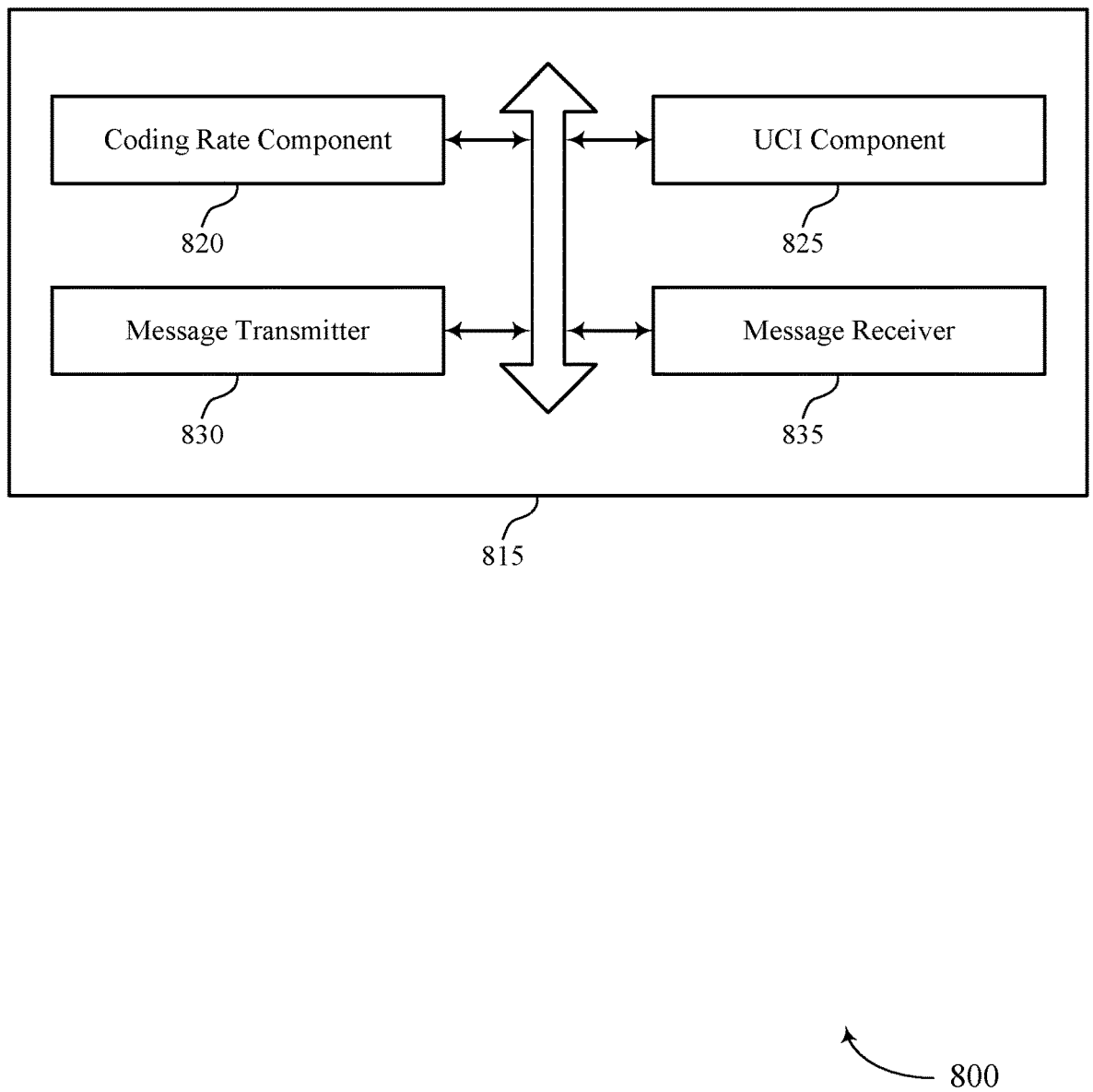

FIG. 8 shows a block diagram 800 of a UE communications manager 815 that supports modifying CSI transmissions over uplink shared resources in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include coding rate component 820, UCI component 825, message transmitter 830, and message receiver 835. Each of these modules may communicate, directly or indirectly, with one another (e.g., via one or more buses).

Coding rate component 820 may identify a coding rate threshold associated with transmitting a UCI message during a time period, transmit a modified coding rate threshold for use in the uplink shared resources, calculate a coding rate for transmitting the subset of the UCI message based on the calculated number of bits and the size of the uplink shared resources, calculate a coding rate for transmitting each of the set of subsets, and calculate a coding rate for transmitting each of the first group and the second group. In some cases, the modified coding rate is based on one of a transport block size or a ratio of control symbols to shared channel symbols.

UCI component 825 may determine whether to reduce a size of the UCI message based on the coding rate threshold, a size of the indicated resource block, the modified coding rate, the reference resource, the coding rate threshold and a size of the uplink shared resources, or any of the combinations, based at least in part on the deployment scheme, further described with reference to FIGS. 1-4. In some cases, UCI component 825 may calculate a number of bits for transmitting at least a subset of the UCI message, reduce the size of the UCI message based on the calculated coding rate, identify a set of subsets of the UCI message, reduce the size of the UCI message by dropping bits associated with any of the set of subsets based on the calculated coding rates, reduce the size of the UCI message based on the coding rate threshold and a size of uplink control resources associated with the time period, and/or identify at least one prioritized subset from the set subsets of the UCI message. In some examples, UCI component 825 may reduce the size of the UCI message by dropping bits associated with any of the set of subsets other than the at least one prioritized subset based on the calculated coding rates. In some cases, the at least one prioritized subset includes bits for conveying a RI, bits for conveying a CRI, or a combination thereof. In some cases, the set of subsets include bits for jointly conveying a CQI and a PMI, bits for conveying a RI, bits for conveying a CRI, or a combination thereof.

In some cases, UCI component 825 may identify a first group and a second group of the set of subsets of the UCI message, reduce the size of the UCI message by dropping bits associated with the first group based on the calculated coding rate for the first group, and/or reduce the size of the UCI message by dropping bits associated with the second group based on the calculated coding rate for the second group. In some cases, the second group includes bits for jointly conveying a PMI, bits for conveying a CQI, or a combination thereof. In some cases, the first group includes bits for conveying a RI, bits for conveying a CRI, or a combination thereof.

Message transmitter 830 may transmit at least a portion of the UCI message on uplink shared resources allocated for the time period, and transmit the UCI message on the uplink shared resources without reducing the size of the UCI message. In some cases, the uplink control resources include PUCCH resources. In some cases, the time period includes a subframe. In some cases, the uplink shared resources include PUSCH resources.

Message receiver 835 may receive an indication message that indicates which of a set of resource blocks of the uplink control resources to use for determining a reduced size of the UCI message, receive a reference resource associated with the uplink shared resources that is configured for calculating a reduced size of the UCI message, and receive an indication of the coding rate threshold. In some cases, the indication message includes an ARI message.

Figure 9:
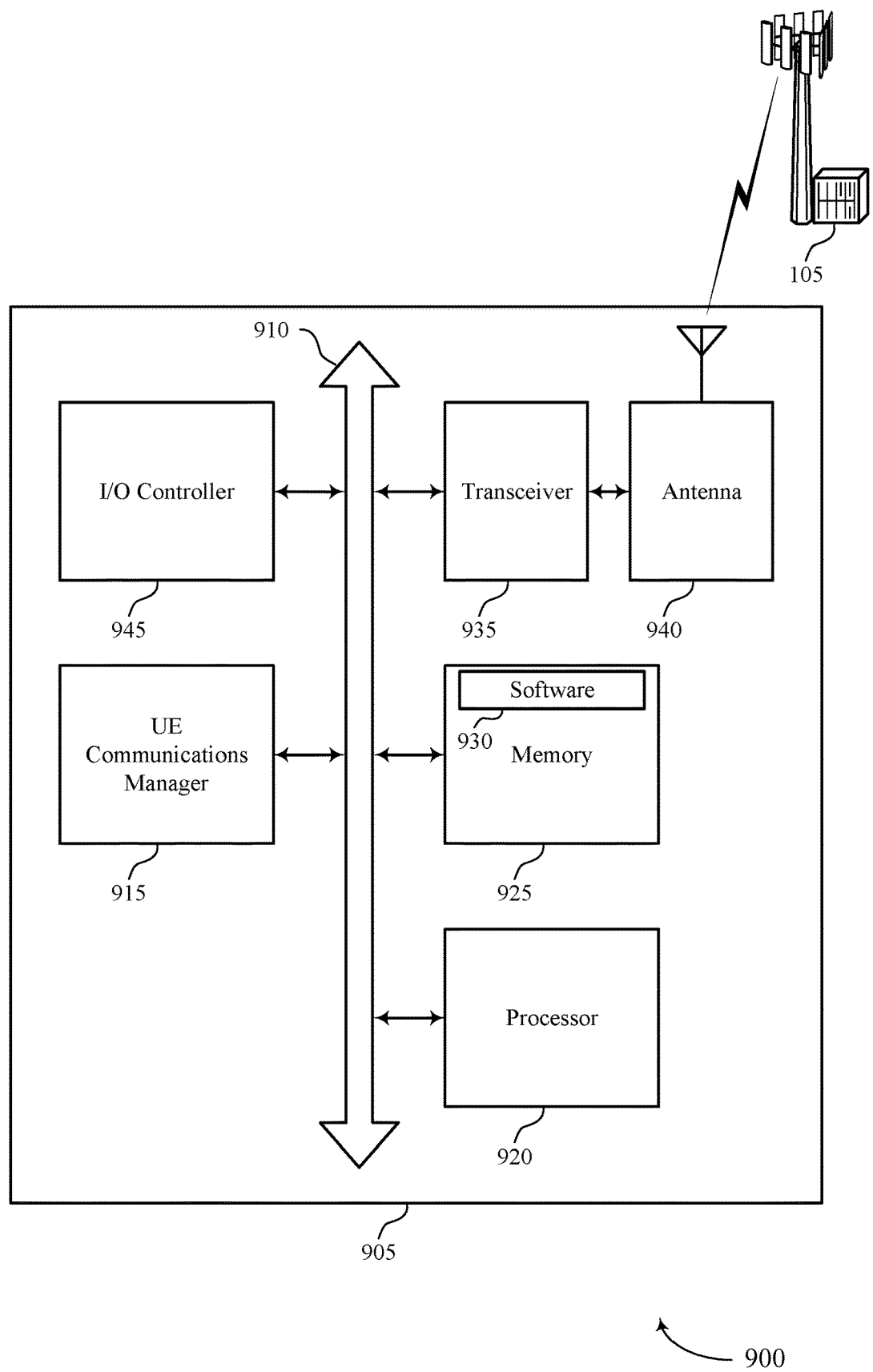
FIG. 9 illustrates a block diagram of a system including a user equipment (UE) that supports modifying CSI transmissions over uplink shared resources in accordance with aspects of the present disclosure.

FIG. 9 shows a diagram of a system 900 including a device 905 that supports modifying CSI transmissions over uplink shared resources in accordance with aspects of the present disclosure. Device 905 may be an example of, or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting modifying CSI transmissions over uplink shared resources).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support modifying CSI transmissions over uplink shared resources. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
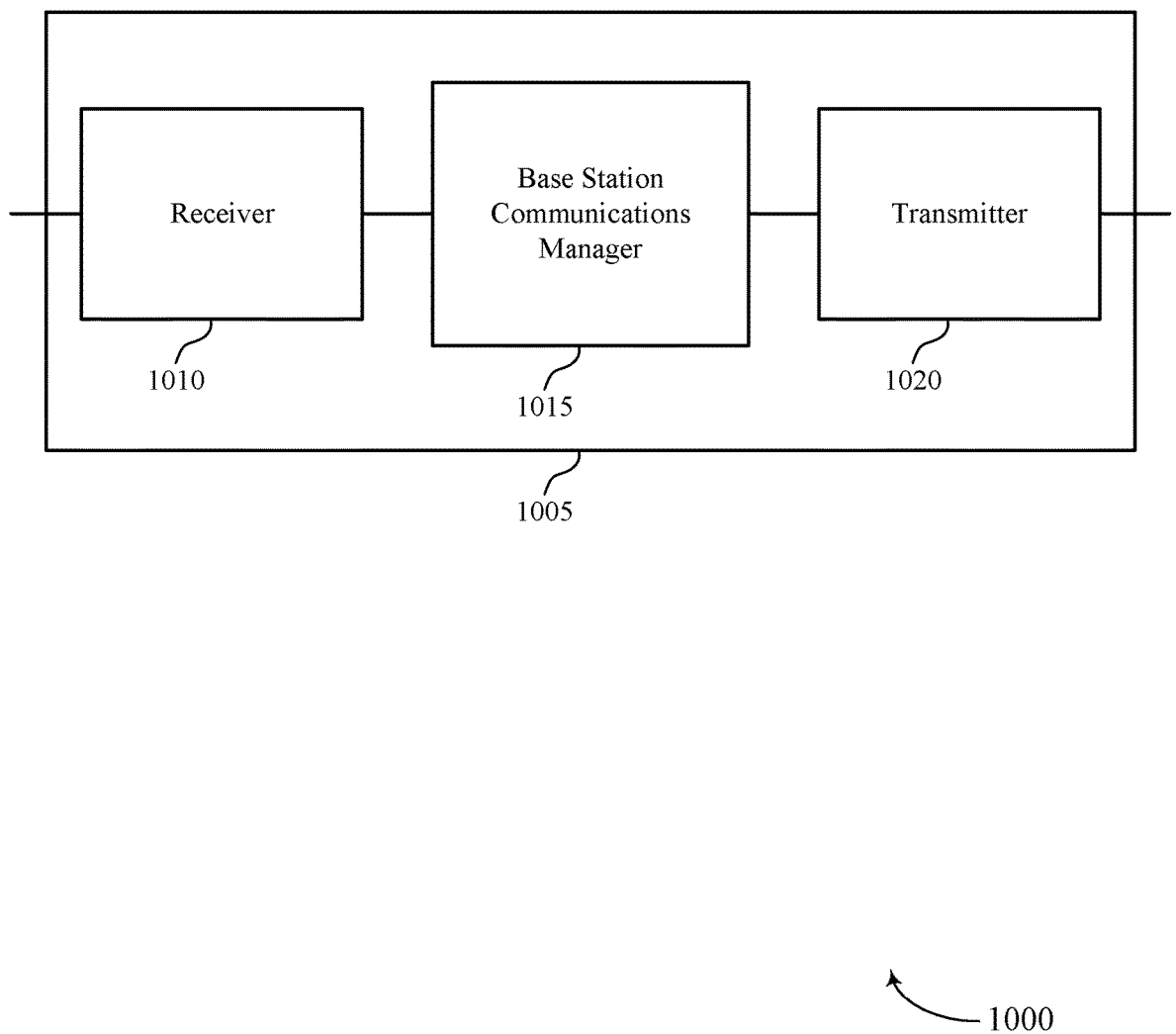
FIGS. 10 through 12 show block diagrams of a device that supports modifying CSI transmissions over uplink shared resources in accordance with aspects of the present disclosure.

FIG. 10 shows a block diagram 1000 of a wireless device 1005 that supports modifying CSI transmissions over uplink shared resources in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to modifying CSI transmissions over uplink shared resources, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify an upcoming transmission of an UCI message during a time period, allocate uplink shared resources for the time period based on a size of the UCI message, and receive at least a portion of the UCI message on the allocated uplink shared resources.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
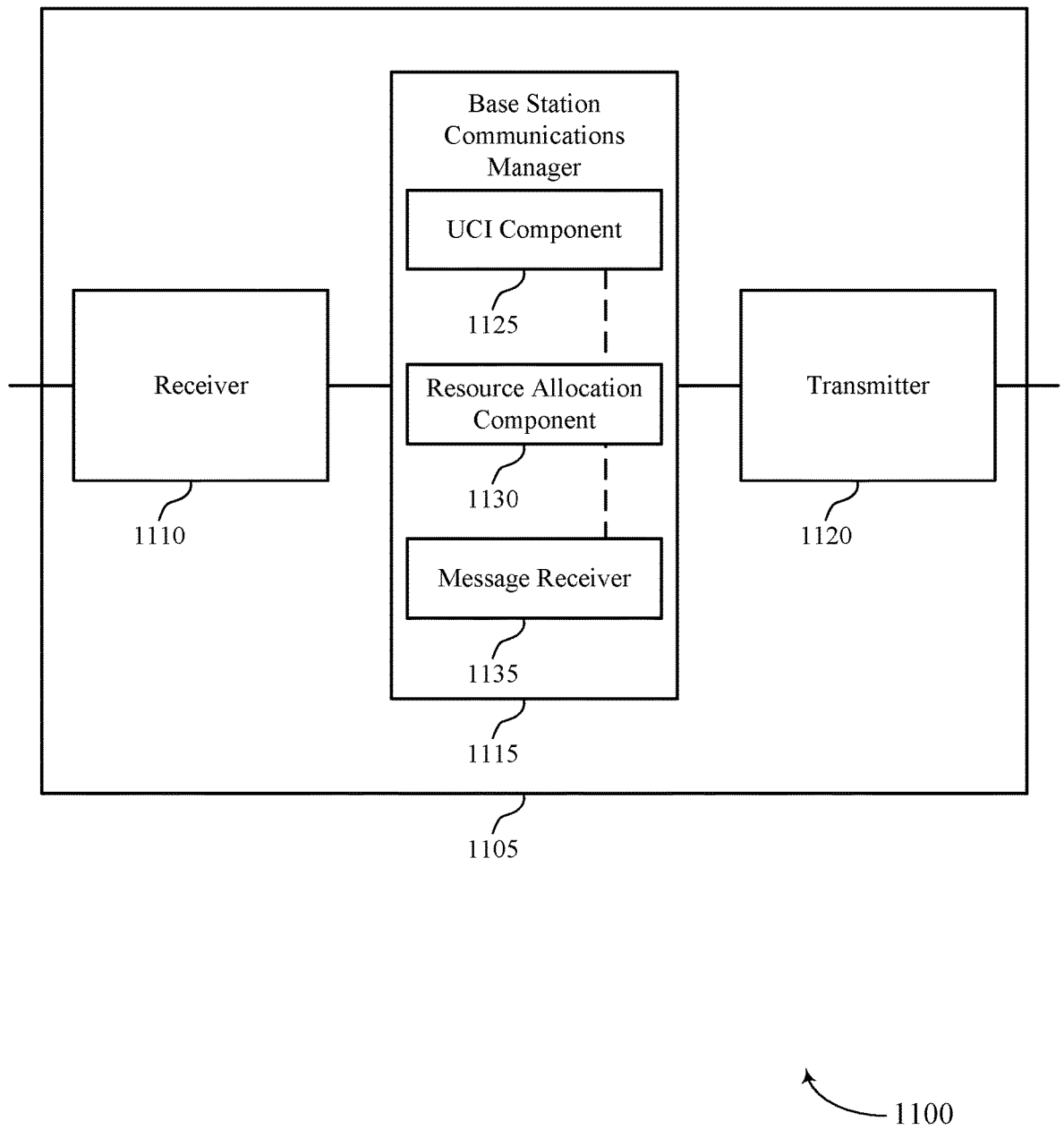

FIG. 11 shows a block diagram 1100 of a wireless device 1105 that supports modifying CSI transmissions over uplink shared resources in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to modifying CSI transmissions over uplink shared resources, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include UCI component 1125, resource allocation component 1130, and message receiver 1135.

UCI component 1125 may identify an upcoming transmission of a UCI message during a time period and determine the size of the UCI message based on a size of an upcoming data transmission during the time period. In some cases, the time period includes a subframe.

Resource allocation component 1130 may allocate uplink shared resources for the time period based on a size of the UCI message. In some cases, the uplink shared resources include PUSCH resources.

Message receiver 1135 may receive at least a portion of the UCI message on the allocated uplink shared resources.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
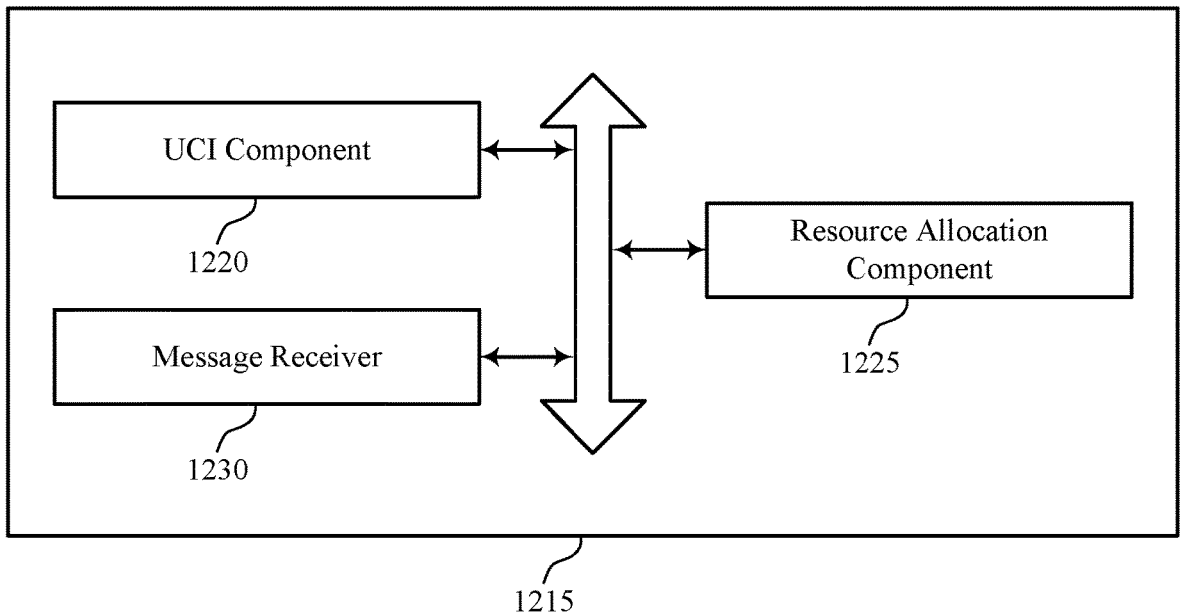

FIG. 12 shows a block diagram 1200 of a base station communications manager 1215 that supports modifying CSI transmissions over uplink shared resources in accordance with aspects of the present disclosure. The base station communications manager 1215 may be an example of aspects of a base station communications manager 1315 described with reference to FIGS. 10, 11, and 13. The base station communications manager 1215 may include UCI component 1220, resource allocation component 1225, and message receiver 1230. Each of these modules may communicate, directly or indirectly, with one another (e.g., via one or more buses).

UCI component 1220 may identify an upcoming transmission of a UCI message during a time period and determine the size of the UCI message based on a size of an upcoming data transmission during the time period. In some cases, the time period includes a subframe.

Resource allocation component 1225 may allocate uplink shared resources for the time period based on a size of the UCI message. In some cases, the uplink shared resources include PUSCH resources.

Message receiver 1230 may receive at least a portion of the UCI message on the allocated uplink shared resources.

Figure 13:
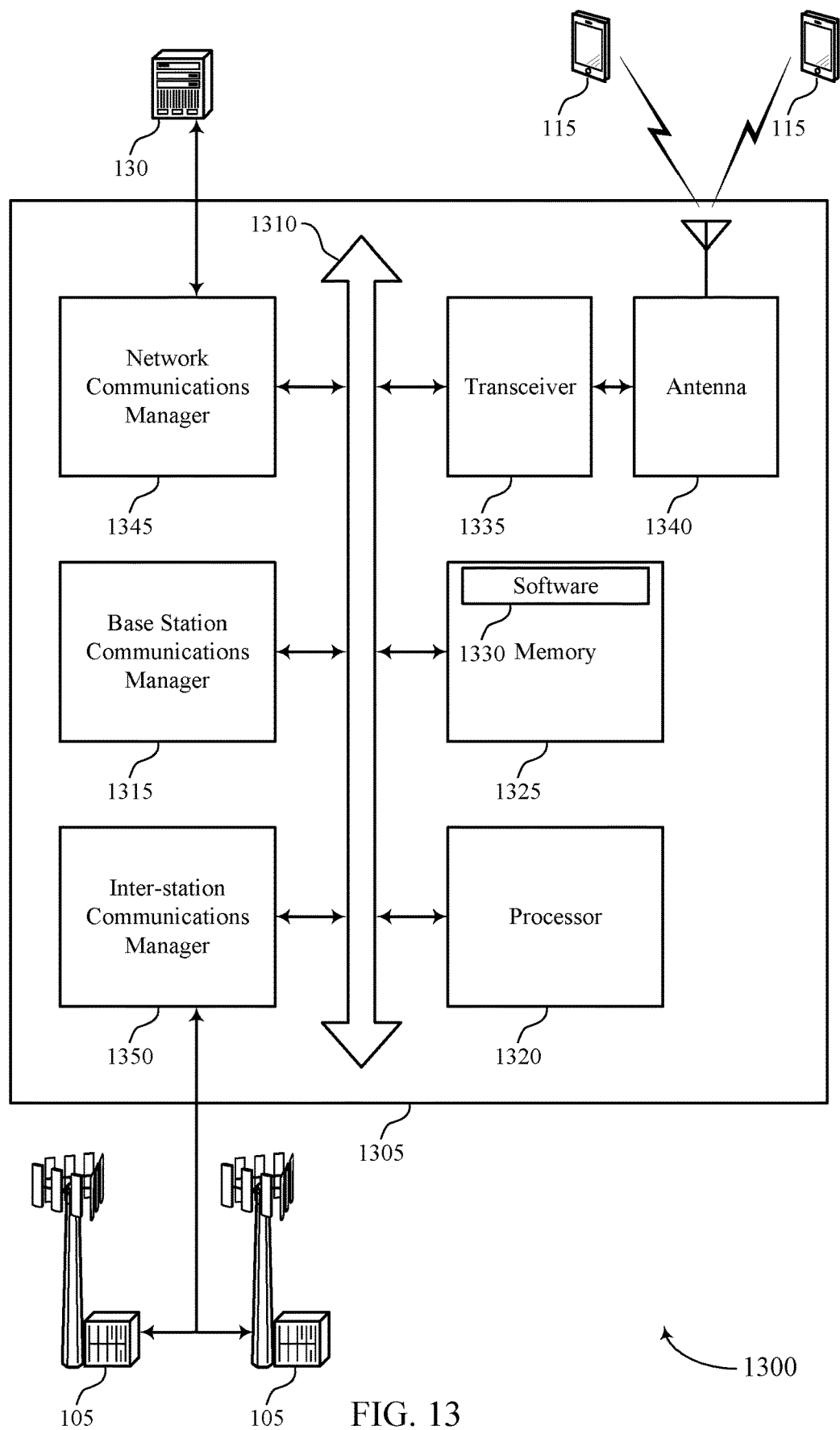
FIG. 13 illustrates a block diagram of a system including a base station that supports modifying CSI transmissions over uplink shared resources in accordance with aspects of the present disclosure.

FIG. 13 shows a diagram of a system 1300 including a device 1305 that supports modifying CSI transmissions over uplink shared resources in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting modifying CSI transmissions over uplink shared resources).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support modifying CSI transmissions over uplink shared resources. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within a Long Term Evolution (LTE)/LTE-A wireless communication network technology to provide communication between base stations 105.

Figure 14:
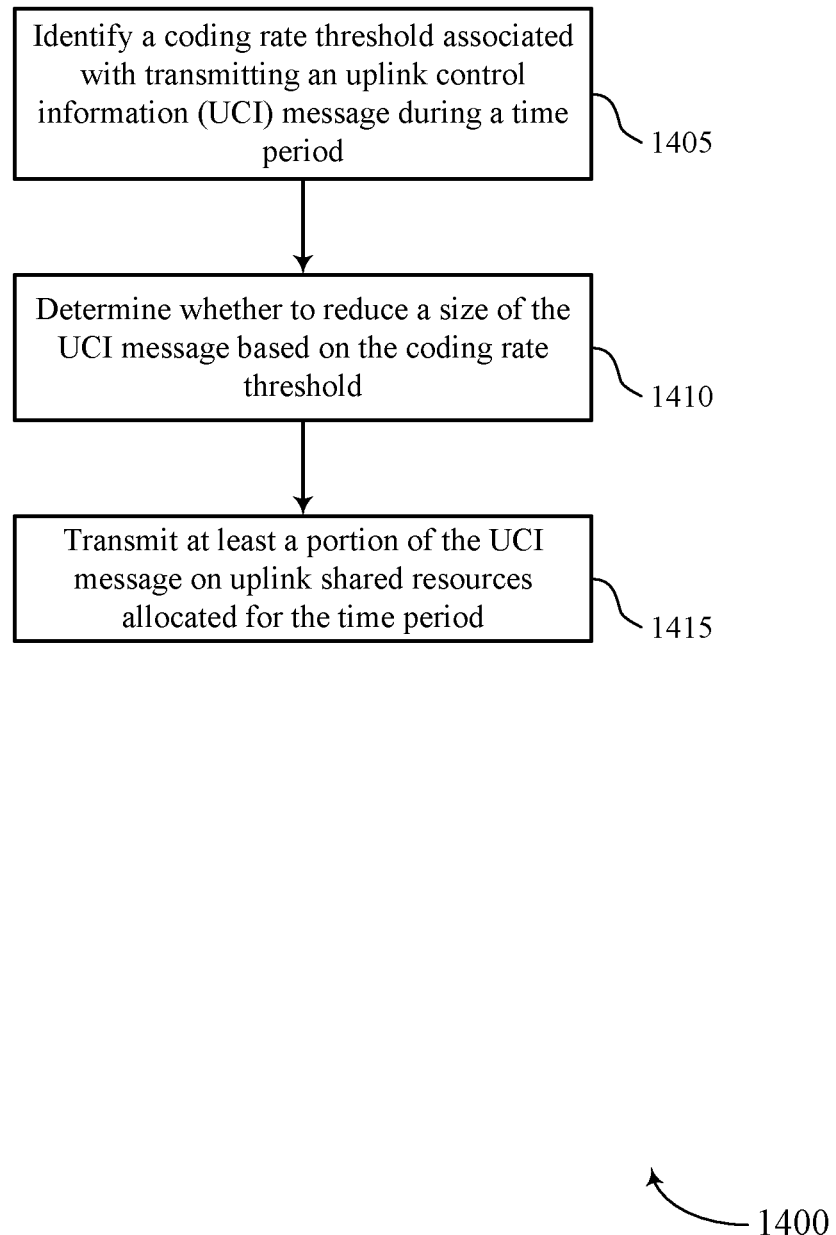
FIGS. 14 through 18 illustrate methods for modifying CSI transmissions over uplink shared resources in accordance with aspects of the present disclosure.

FIG. 14 shows a flowchart illustrating a method 1400 for modifying CSI transmissions over uplink shared resources in accordance with aspects of the present disclosure. The operations of method 1400 may be implemented by a UE 115 or its components as described herein. For example, the operations of method 1400 may be performed by a UE CSI dropping manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may identify a coding rate threshold associated with transmitting an UCI message during a time period. The operations of 1405 may be performed according to the methods described herein. In certain examples, aspects of the operations of 1405 may be performed by a coding rate component as described with reference to FIGS. 6 through 9.

At 1410, the UE 115 may determine whether to reduce a size of the UCI message based at least in part on the coding rate threshold. The operations of 1410 may be performed according to the methods described herein. In certain examples, aspects of the operations of 1410 may be performed by a UCI component as described with reference to FIGS. 6 through 9.

At 1415, the UE 115 may transmit at least a portion of the UCI message on uplink shared resources allocated for the time period. The operations of 1415 may be performed according to the methods described herein. In certain examples, aspects of the operations of 1415 may be performed by a message transmitter as described with reference to FIGS. 6 through 9.

Figure 15:
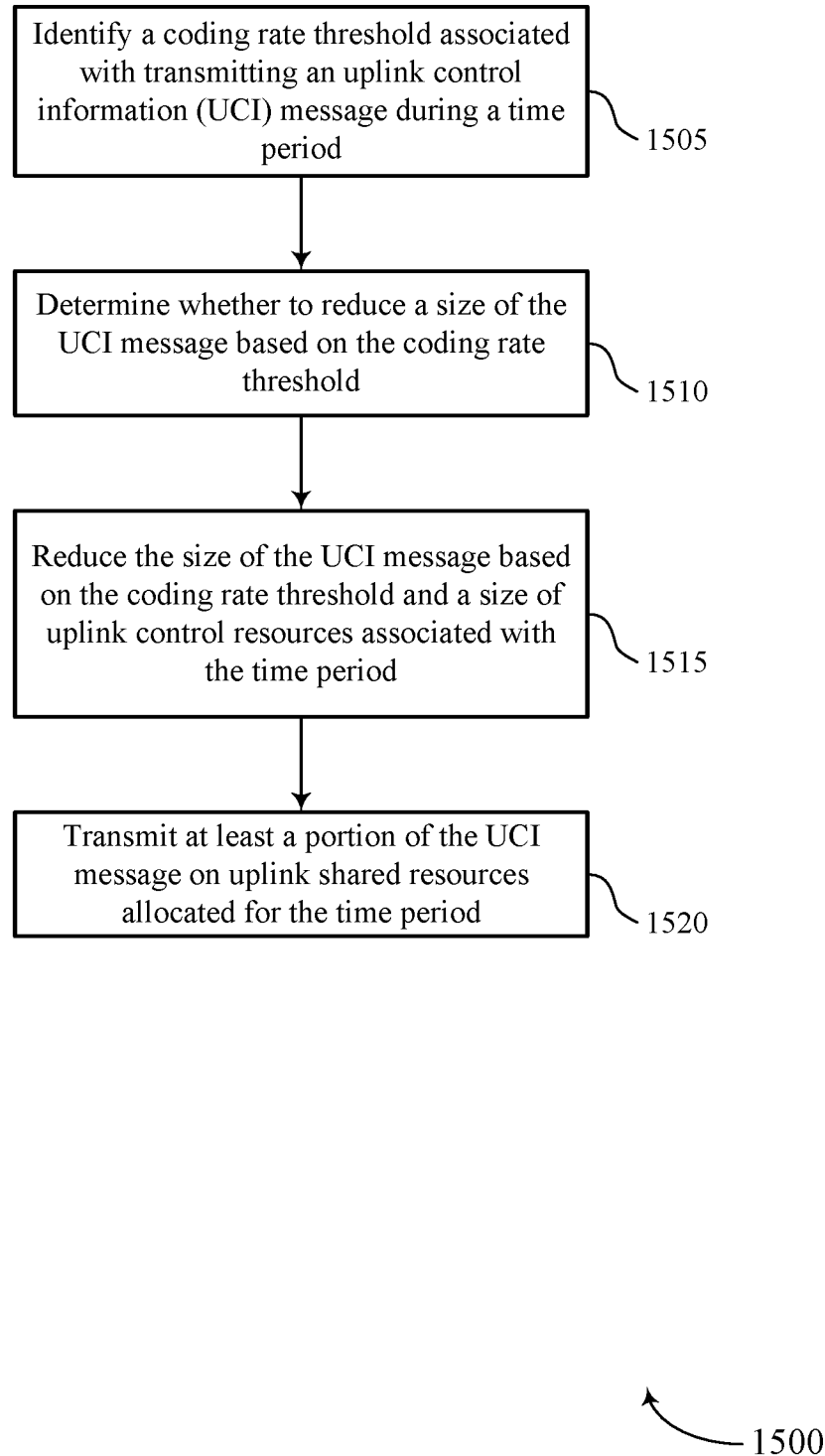

FIG. 15 shows a flowchart illustrating a method 1500 for modifying CSI transmissions over uplink shared resources in accordance with aspects of the present disclosure. The operations of method 1500 may be implemented by a UE 115 or its components as described herein. For example, the operations of method 1500 may be performed by a UE CSI dropping manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may identify a coding rate threshold associated with transmitting an UCI message during a time period. The operations of 1505 may be performed according to the methods described herein. In certain examples, aspects of the operations of 1505 may be performed by a coding rate component as described with reference to FIGS. 6 through 9.

At 1510, the UE 115 may determine whether to reduce a size of the UCI message based at least in part on the coding rate threshold. The operations of 1510 may be performed according to the methods described herein. In certain examples, aspects of the operations of 1510 may be performed by a UCI component as described with reference to FIGS. 6 through 9.

At 1515, the UE 115 may reduce the size of the UCI message based at least in part on the coding rate threshold and a size of uplink control resources associated with the time period. The operations of 1515 may be performed according to the methods described herein. In certain examples, aspects of the operations of 1515 may be performed by a UCI component as described with reference to FIGS. 6 through 9.

At 1520, the UE 115 may transmit at least a portion of the UCI message on uplink shared resources allocated for the time period. The operations of 1520 may be performed according to the methods described herein. In certain examples, aspects of the operations of 1520 may be performed by a message transmitter as described with reference to FIGS. 6 through 9.

Figure 16:
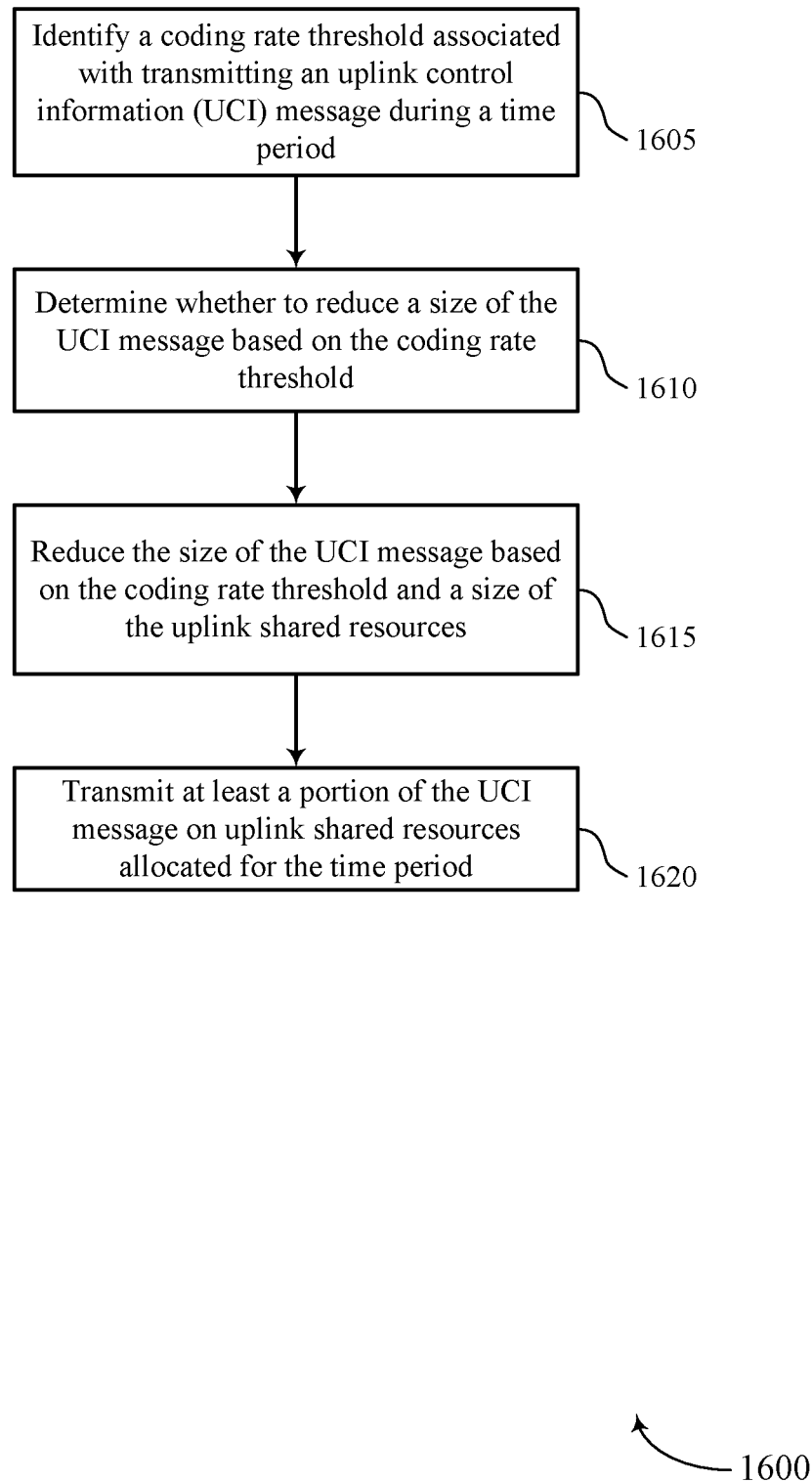

FIG. 16 shows a flowchart illustrating a method 1600 for modifying CSI transmissions over uplink shared resources in accordance with aspects of the present disclosure. The operations of method 1600 may be implemented by a UE 115 or its components as described herein. For example, the operations of method 1600 may be performed by a UE CSI dropping manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605, the UE 115 may identify a coding rate threshold associated with transmitting an UCI message during a time period. The operations of 1605 may be performed according to the methods described herein. In certain examples, aspects of the operations of 1605 may be performed by a coding rate component as described with reference to FIGS. 6 through 9.

At 1610, the UE 115 may determine whether to reduce a size of the UCI message based at least in part on the coding rate threshold. The operations of 1610 may be performed according to the methods described herein. In certain examples, aspects of the operations of 1610 may be performed by a UCI component as described with reference to FIGS. 6 through 9.

At 1615 the UE 115 may reduce the size of the UCI message based at least in part on the coding rate threshold and a size of the uplink shared resources. The operations of 1615 may be performed according to the methods described herein. In certain examples, aspects of the operations of 1615 may be performed by a UCI component as described with reference to FIGS. 6 through 9.

At 1620, the UE 115 may transmit at least a portion of the UCI message on uplink shared resources allocated for the time period. The operations of 1620 may be performed according to the methods described herein. In certain examples, aspects of the operations of 1620 may be performed by a message transmitter as described with reference to FIGS. 6 through 9.

Figure 17:
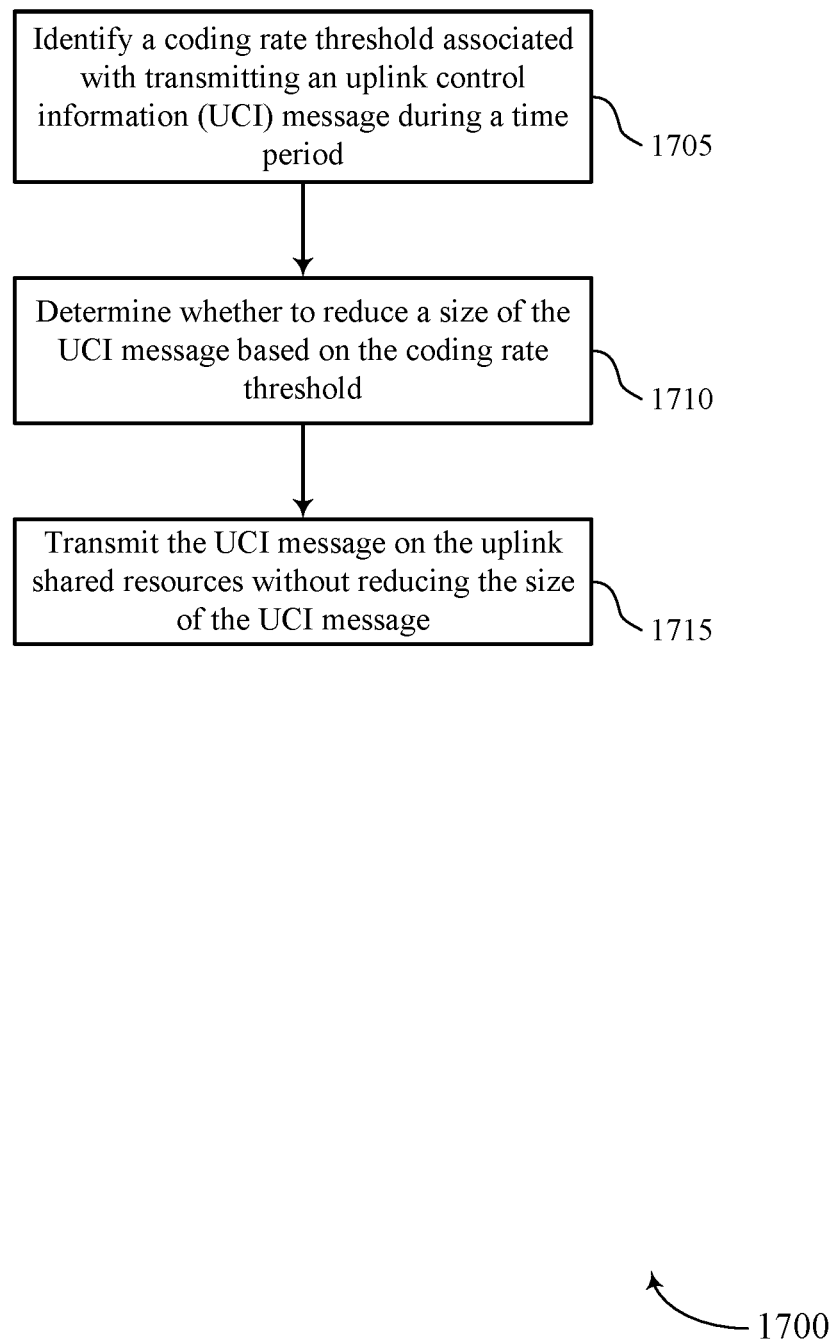

FIG. 17 shows a flowchart illustrating a method 1700 for modifying CSI transmissions over uplink shared resources in accordance with aspects of the present disclosure. The operations of method 1700 may be implemented by a UE 115 or its components as described herein. For example, the operations of method 1700 may be performed by a UE CSI dropping manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may identify a coding rate threshold associated with transmitting an UCI message during a time period. The operations of 1705 may be performed according to the methods described herein. In certain examples, aspects of the operations of 1705 may be performed by a coding rate component as described with reference to FIGS. 6 through 9.

At 1710, the UE 115 may determine whether to reduce a size of the UCI message based at least in part on the coding rate threshold. The operations of 1710 may be performed according to the methods described herein. In certain examples, aspects of the operations of 1710 may be performed by a UCI component as described with reference to FIGS. 6 through 9.

At 1715, the UE 115 may transmit the UCI message on the uplink shared resources without reducing the size of the UCI message. The operations of 1715 may be performed according to the methods described herein. In certain examples, aspects of the operations of 1715 may be performed by a message transmitter as described with reference to FIGS. 6 through 9.

Figure 18:
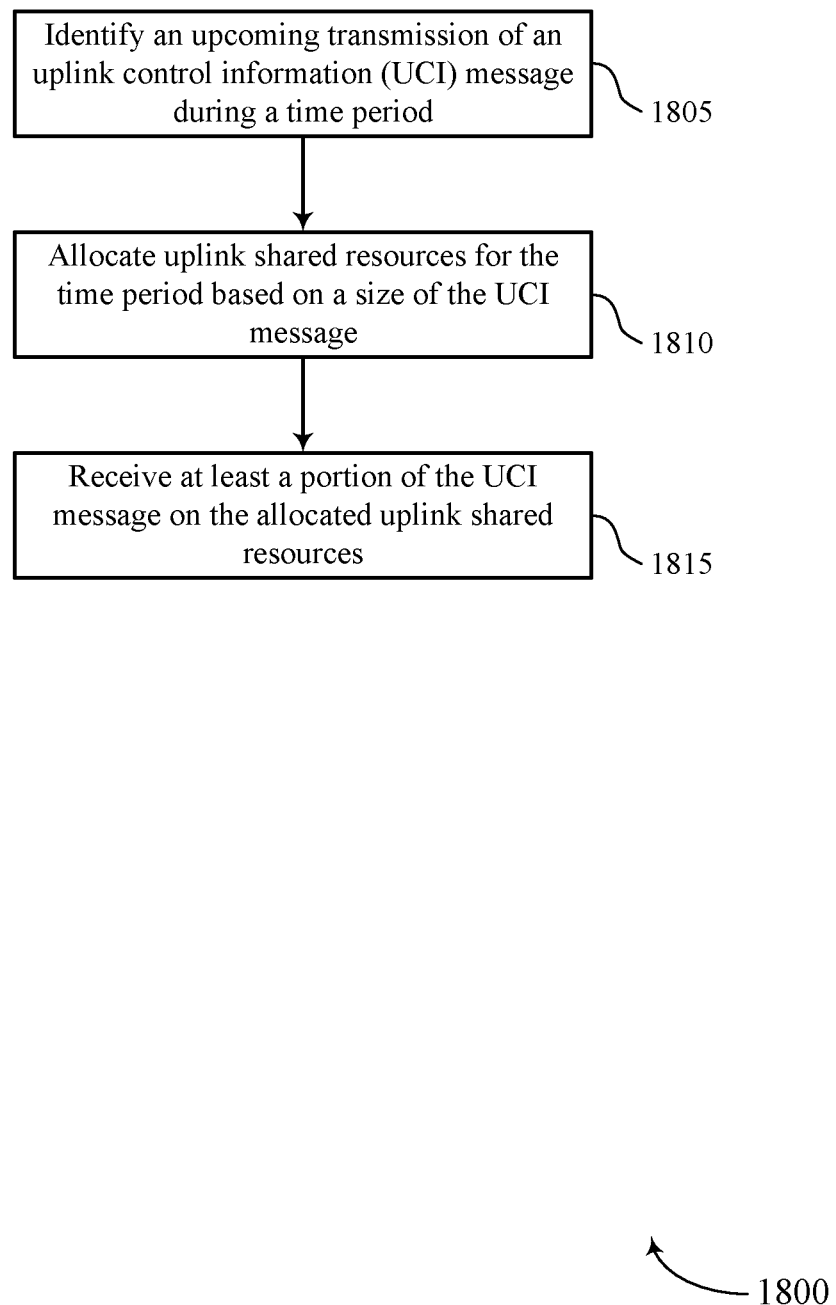

FIG. 18 shows a flowchart illustrating a method 1800 for modifying CSI transmissions over uplink shared resources in accordance with aspects of the present disclosure. The operations of method 1800 may be implemented by a base station 105 or its components as described herein. For example, the operations of method 1800 may be performed by a base station CSI dropping manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805, the base station 105 may identify an upcoming transmission of an UCI message during a time period. The operations of 1805 may be performed according to the methods described herein. In certain examples, aspects of the operations of 1805 may be performed by a UCI component as described with reference to FIGS. 10 through 13.

At 1810, the base station 105 may allocate uplink shared resources for the time period based at least in part on a size of the UCI message. The operations of 1810 may be performed according to the methods described herein. In certain examples, aspects of the operations of 1810 may be performed by a resource allocation component as described with reference to FIGS. 10 through 13.

At 1815, the base station 105 may receive at least a portion of the UCI message on the allocated uplink shared resources. The operations of 1815 may be performed according to the methods described herein. In certain examples, aspects of the operations of 1815 may be performed by a message receiver as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a threshold associated with transmitting an uplink control information (UCI) message during a time period, the threshold being based at least in part on a coding rate;
   determining whether to reduce a size of the UCI message based at least in part on the threshold;
   receiving an indication message that indicates which resource block of a plurality of resource blocks of uplink control resources associated with the time period to use for determining a reduced size of the UCI message;
   reducing the size of the UCI message based at least in part on a size of the indicated resource block; and
   transmitting at least a portion of the UCI message on uplink shared resources allocated for the time period.

2. The method of claim 1, further comprising:
   receiving an indication of the coding rate.

3. The method of claim 1, wherein the time period comprises a subframe.

4. The method of claim 1, wherein the uplink shared resources comprise physical uplink shared channel (PUSCH) resources.

5. The method of claim 1, further comprising:
   reducing the size of the UCI message based at least in part on the threshold and a size of the uplink control resources associated with the time period.

6. The method of claim 5, further comprising:
   transmitting a modified threshold for use in the uplink shared resources; and
   reducing the size of the UCI message based at least in part on the modified threshold.

7. The method of claim 6, wherein the modified threshold is based at least in part on one of a transport block size or a ratio of control symbols to shared channel symbols.

8. The method of claim 5, further comprising:
   receiving a reference resource associated with the uplink shared resources that is configured for calculating the reduced size of the UCI message; and
   reducing the size of the UCI message based at least in part on the reference resource.

9. The method of claim 5, wherein the uplink control resources comprise physical uplink control channel (PUCCH) resources.

10. The method of claim 1, wherein the indication message comprises an acknowledgment resource indicator (ARI) message.

11. The method of claim 1, further comprising:
reducing the size of the UCI message based at least in part on the threshold and a size of the uplink shared resources.

12. The method of claim 11, further comprising:
calculating a quantity of bits for transmitting at least a subset of the UCI message;
calculating a coding rate for transmitting the subset of the UCI message based at least in part on the calculated quantity of bits and the size of the uplink shared resources; and
reducing the size of the UCI message based at least in part on the calculated coding rate.

13. The method of claim 11, further comprising:
identifying a plurality of subsets of the UCI message;
calculating a coding rate for transmitting each subset of the plurality of subsets of the UCI message; and
reducing the size of the UCI message by dropping bits associated with any subset of the plurality of subsets of the UCI message based at least in part on the calculated coding rate.

14. The method of claim 13, wherein the plurality of subsets of the UCI message comprise bits for jointly conveying a channel quality indicator (CQI) and a precoding matrix indicator (PMI), bits for conveying a rank indicator (RI), bits for conveying a channel state information reference signal indicator (CRI), or a combination thereof.

15. An apparatus for wireless communication, comprising:
a processor,
memory coupled with the processor; and
instructions stored in the memory and operable, when executed by the processor, to cause the apparatus to:
identify a threshold associated with transmitting an uplink control information (UCI) message during a time period, the threshold being based at least in part on a coding rate;
determine whether to reduce a size of the UCI message based at least in part on the threshold;
receive an indication message that indicates which resource block of a plurality of resource blocks of uplink control resources associated with the time period to use for determining a reduced size of the UCI message;
reduce the size of the UCI message based at least in part on a size of the indicated resource block; and
transmit at least a portion of the UCI message on uplink shared resources allocated for the time period.

16. The apparatus of claim 15, wherein the instructions are further executable by the processor to cause the apparatus to:
receive an indication of the coding rate.

17. The apparatus of claim 15, wherein the time period comprises a subframe.

18. The apparatus of claim 15, wherein the uplink shared resources comprise physical uplink shared channel (PUSCH) resources.

19. The apparatus of claim 15, wherein the instructions are further executable by the processor to cause the apparatus to:

reduce the size of the UCI message based at least in part on the threshold and a size of the uplink control resources associated with the time period.

20. The apparatus of claim 15, wherein the indication message comprises an acknowledgment resource indicator (ARI) message.

21. An apparatus for wireless communication, comprising:
means for identifying a threshold associated with transmitting an uplink control information (UCI) message during a time period, the threshold being based at least in part on a coding rate;
means for determining whether to reduce a size of the UCI message based at least in part on the threshold;
means for receiving an indication message that indicates which resource block of a plurality of resource blocks of uplink control resources associated with the time period to use for determining a reduced size of the UCI message;
means for reducing the size of the UCI message based at least in part on a size of the indicated resource block; and
means for transmitting at least a portion of the UCI message on uplink shared resources allocated for the time period.

22. The apparatus of claim 21, further comprising:
means for receiving an indication of the coding rate.

23. The apparatus of claim 21, wherein the time period comprises a subframe.

24. The apparatus of claim 21, wherein the uplink shared resources comprise physical uplink shared channel (PUSCH) resources.

25. The apparatus of claim 21, further comprising:
means for reducing the size of the UCI message based at least in part on the threshold and a size of the uplink control resources associated with the time period.

26. The apparatus of claim 21, wherein the indication message comprises an acknowledgment resource indicator (ARI) message.

27. A non-transitory computer-readable medium storing code for wireless communication, the code comprising instructions executable by a processor to:
identify a threshold associated with transmitting an uplink control information (UCI) message during a time period, the threshold being based at least in part on a coding rate;
determine whether to reduce a size of the UCI message based at least in part on the threshold;
receive an indication message that indicates which resource block of a plurality of resource blocks of uplink control resources associated with the time period to use for determining a reduced size of the UCI message;
reduce the size of the UCI message based at least in part on a size of the indicated resource block; and
transmit at least a portion of the UCI message on uplink shared resources allocated for the time period.

28. The non-transitory computer-readable medium of claim 27, wherein the instructions are further executable by the processor to:
receive an indication of the coding rate.

29. The non-transitory computer-readable medium of claim 27, wherein the time period comprises a subframe.

30. The non-transitory computer-readable medium of claim 27, wherein the uplink shared resources comprise physical uplink shared channel (PUSCH) resources.

31. The non-transitory computer-readable medium of claim 27, wherein the instructions are further executable by the processor to:

reduce the size of the UCI message based at least in part on the threshold and a size of the uplink control resources associated with the time period.

32. The non-transitory computer-readable medium of claim 27, wherein the indication message comprises an acknowledgment resource indicator (ARI) message.

* * * * *